United States Patent
Lee et al.

(10) Patent No.: US 12,225,591 B2
(45) Date of Patent: Feb. 11, 2025

(54) METHOD AND APPARATUS FOR INITIAL ACCESS IN COMMUNICATION SYSTEM

(71) Applicant: ELECTRONICS AND TELECOMMUNICATIONS RESEARCH INSTITUTE, Daejeon (KR)

(72) Inventors: Jung Hoon Lee, Daejeon (KR); Cheul Soon Kim, Daejeon (KR); Sung Hyun Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 372 days.

(21) Appl. No.: 17/681,290

(22) Filed: Feb. 25, 2022

(65) Prior Publication Data

US 2022/0279590 A1    Sep. 1, 2022

(30) Foreign Application Priority Data

| Feb. 26, 2021 | (KR) | 10-2021-0026549 |
| May 11, 2021 | (KR) | 10-2021-0060503 |
| Aug. 5, 2021 | (KR) | 10-2021-0103456 |
| Oct. 1, 2021 | (KR) | 10-2021-0131220 |
| Nov. 4, 2021 | (KR) | 10-2021-0150839 |
| Feb. 11, 2022 | (KR) | 10-2022-0018116 |

(51) Int. Cl.
*H04W 74/0833* (2024.01)
*H04W 72/0446* (2023.01)

(52) U.S. Cl.
CPC ... *H04W 74/0833* (2013.01); *H04W 72/0446* (2013.01)

(58) Field of Classification Search
CPC .......... H04W 74/0833; H04W 72/0446; H04L 5/003; H04L 27/26; H04L 27/2647; H04L 27/26025
See application file for complete search history.

(56) References Cited

U.S. PATENT DOCUMENTS

| 2020/0205102 A1 | 6/2020 | Islam et al. |
| 2020/0351947 A1* | 11/2020 | Lei ................... H04W 72/0446 |
| 2020/0351957 A1 | 11/2020 | Kim |
| 2021/0022096 A1 | 1/2021 | Rane et al. |
| 2021/0100042 A1 | 4/2021 | Agiwal et al. |

(Continued)

FOREIGN PATENT DOCUMENTS

| WO | 2017/022870 A1 | 2/2017 |
| WO | 2020/145751 A1 | 7/2020 |

(Continued)

*Primary Examiner* — Hanh N Nguyen
(74) *Attorney, Agent, or Firm* — Rabin & Berdo, P.C.

(57) ABSTRACT

An operation method of a terminal in a communication system may comprise: receiving, from a base station, a first SSB; determining a RACH occasion associated with the first SSB; transmitting, to the base station, a PRACH preamble in the RACH occasion within a first radio resource to which a first SCS is applied; determining a slot to which the RACH occasion belongs based on a reference radio resource to which a reference SCS is applied instead of the first SCS; determining an RNTI for a random access procedure based on a slot index for the slot; and performing a reception operation of a response for the PRACH preamble by using the RNTI in the first radio resource.

12 Claims, 15 Drawing Sheets

(56) References Cited

U.S. PATENT DOCUMENTS

| | | | | |
|---|---|---|---|---|
| 2021/0120592 A1* | 4/2021 | Takahashi | ............ | H04W 48/12 |
| 2021/0352737 A1* | 11/2021 | Yang | ................. | H04W 74/0833 |
| 2023/0345546 A1* | 10/2023 | Lin | ................... | H04W 74/0833 |
| 2024/0306208 A1* | 9/2024 | Shin | ................. | H04W 74/0833 |

FOREIGN PATENT DOCUMENTS

| | | |
|---|---|---|
| WO | 2020/184954 A1 | 9/2020 |
| WO | 2021/020822 A1 | 2/2021 |

\* cited by examiner

RMSI CORESET mapping pattern #2

RMSI CORESET mapping pattern #3

METHOD AND APPARATUS FOR INITIAL ACCESS IN COMMUNICATION SYSTEM

CROSS-REFERENCE TO RELATED APPLICATIONS

This application claims priority to Korean Patent Applications No. 10-2021-0026549 filed on Feb. 26, 2021, No. 10-2021-0060503 filed on May 11, 2021, No. 10-2021-0103456 filed on Aug. 5, 2021, No. 10-2021-0131220 filed on Oct. 1, 2021, No. 10-2021-0150839 filed on Nov. 4, 2021, and No. 10-2022-0018116 filed on Feb. 11, 2022 with the Korean Intellectual Property Office (KIPO), the entire contents of which are hereby incorporated by reference.

BACKGROUND

1. Technical Field

The present disclosure relates to a new radio (NR) communication technique, and more particularly, to an initial access technique in a high frequency band.

2. Related Art

The communication system (e.g., a new radio (NR) communication system) using a higher frequency band (e.g., a frequency band of 6 GHz or above) than a frequency band (e.g., a frequency band of 6 GHz or below) of the long term evolution (LTE) communication system (or, LTE-A communication system) is being considered for processing of soaring wireless data. The NR system may support not only a frequency band of 6 GHz or below, but also a frequency band of 6 GHz or above, and may support various communication services and scenarios compared to the LTE system. In addition, requirements of the NR system may include enhanced Mobile BroadBand (eMBB), Ultra Reliable Low Latency Communication (URLLC), and Massive Machine Type Communication (mMTC).a Meanwhile, the number of synchronization signal blocks (SSBs) may increase in a high frequency band. In this case, it is necessary to change a method of determining a random access channel (RACH) occasion (RO) associated with an SSB index in an initial access procedure. In addition, a communication system operating in a high frequency band may support various subcarrier spacings (SCSs). In this case, methods for calculating a radio network temporary identifier (RNTI) for an RA procedure in consideration of an SCS are needed.

SUMMARY

Accordingly, exemplary embodiments of the present disclosure are directed to providing a method and an apparatus for initial access in a high frequency band.

According to a first exemplary embodiment of the present disclosure, an operation method of a terminal in a communication system may comprise: receiving, from a base station, a first synchronization signal block (SSB); determining a random access channel (RACH) occasion (RO) associated with the first SSB; transmitting, to the base station, a physical random access channel (PRACH) preamble in the RO within a first radio resource to which a first subcarrier spacing (SCS) is applied; determining a slot to which the RO belongs based on a reference radio resource to which a reference SCS is applied instead of the first SCS; determining a radio network temporary identifier (RNTI) for a random access (RA) procedure based on a slot index for the slot; and performing a reception operation of a response for the PRACH preamble by using the RNTI in the first radio resource.

The first SCS may be a 480 kHz SCS or a 960 kHz SCS, the reference SCS may be a 120 kHz SCS, and the RNTI may be a random access (RA)-RNTI or an MSGB-RNTI.

One first-type slot in the reference radio resource may include n second-type slots in the first radio resource, the RO may be located in one or more second-type slots among the n second-type slots, the slot index used to determine the RNTI may be a slot index of the one first-type slot instead of the one or more second-type slots, and n may be a natural number equal to or greater than 2.

A start slot of the RO may be limited to a specific second-type slot among the n second-type slots.

The one or more second-type slots may be located last among the n second-type slots.

According to a second exemplary embodiment of the present disclosure, an operation method of a base station in a communication system may comprise: transmitting a first synchronization signal block (SSB); receiving, from a terminal, a physical random access channel (PRACH) preamble in a random access channel (RACH) occasion (RO) associated with the first SSB in a first radio resource to which a first subcarrier spacing (SCS) is applied; determining a slot to which the RO belongs based on a reference radio resource to which a reference SCS is applied instead of the first SCS; determining a radio network temporary identifier (RNTI) for a random access (RA) procedure based on a slot index for the slot; and performing a transmission operation of a response for the PRACH preamble by using the RNTI in the first radio resource.

The first SCS may be a 480 kHz SCS or a 960 kHz SCS, the reference SCS may be a 120 kHz SCS, and the RNTI may be a random access (RA)-RNTI or an MSGB-RNTI.

One first-type slot in the reference radio resource may include n second-type slots in the first radio resource, the RO may be located in one or more second-type slots among the n second-type slots, the slot index used to determine the RNTI may be a slot index of the one first-type slot instead of the one or more second-type slots, and n may be a natural number equal to or greater than 2.

A start slot of the RO may be limited to a specific second-type slot among the n second-type slots.

The one or more second-type slots may be located last among the n second-type slots.

According to a third exemplary embodiment of the present disclosure, a terminal in a communication system may comprise: a processor; a memory electronically communicating with the processor; and instructions stored in the memory, wherein when executed by the processor, the instructions cause the terminal to: receive, from a base station, a first synchronization signal block (SSB); determine an SSB index associated with the first SSB based on a different scheme according to a frequency band in which the base station operates; determine a random access channel (RACH) occasion (RO) associated with the SSB index; and transmit a physical random access channel (PRACH) preamble to the base station in the RO.

The base station may operate in a first frequency band, the SSB index may be determined based on a first equation or a second equation, and when the base station operates in a second frequency band higher than the first frequency band, the SSB index may be determined based on the second equation.

The first equation may be [an index of a physical broadcast channel (PBCH) demodulation reference signal (DMRS) mod $N_{SSB}^{QCL}$], the second equation may be [an SSB candidate index mod $N_{SSB}^{QCL}$], the PBCH DMRS may be included in the first SSB, the SSB candidate index may be associated with the first SSB, and $N_{SSB}^{QCL}$ may indicate a number of SSBs having a quasi-co-located (QCL) relation.

The SSB index associated with the first SSB may be an SSB index for a second SSB having a QCL relation with the first SSB.

According to the present disclosure, the terminal may determine an SSB index based on different schemes in different frequency bands (e.g., a low frequency band and a high frequency band), and may determine an RO associated with the SSB index. Accordingly, in a communication system operating in a low frequency band and/or a high frequency band, the RO can be accurately determined. In addition, in a communication system supporting various SCSs, the base station and/or the terminal may determine an RNTI for an RA procedure according to a slot index based on a reference SCS. Accordingly, a problem in which the same RNTI is calculated in the initial access procedure can be solved.

DETAILED DESCRIPTION OF THE EMBODIMENTS

Figure 1:
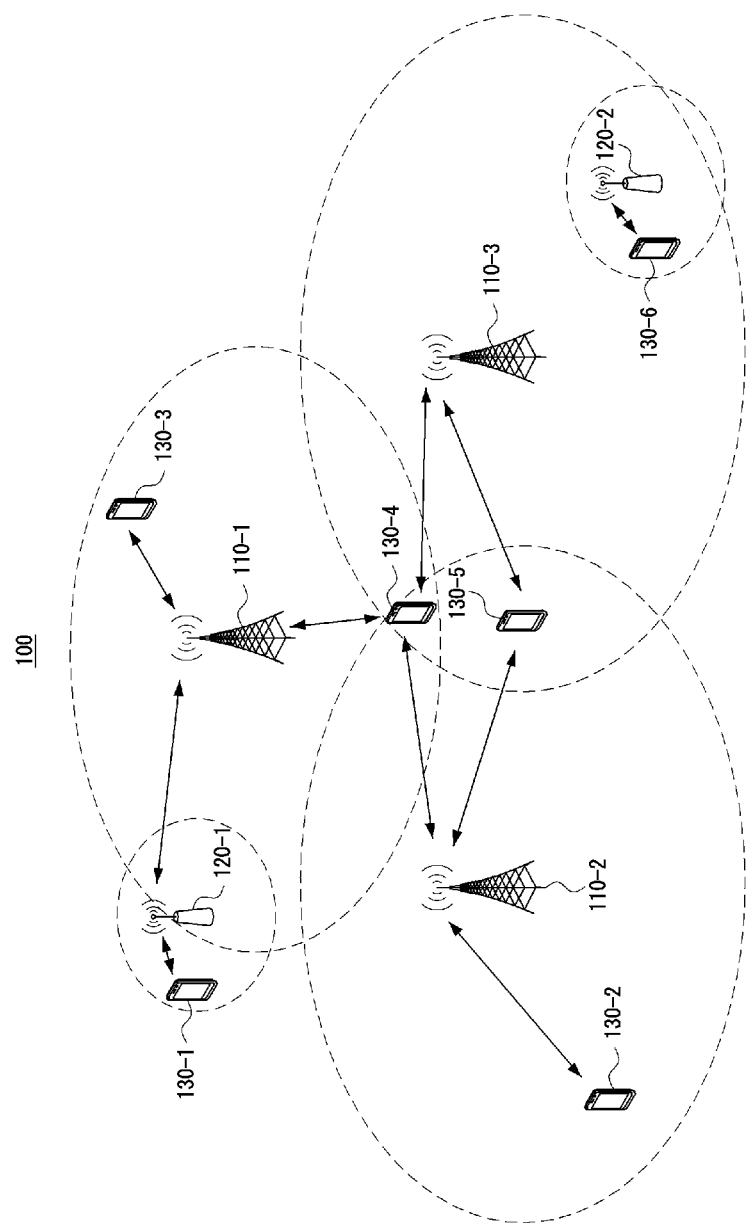
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

In exemplary embodiments of the present disclosure, "(re)transmission" may mean "transmission", "retransmission", or "transmission and retransmission", "(re)configuration" may mean "configuration", "reconfiguration", or "configuration and reconfiguration", "(re)connection" may mean "connection", "reconnection", or "connection and reconnection", and "(re)access" may mean "access", "re-access", or "access and re-access".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

In exemplary embodiments, "an operation (e.g., transmission operation) is configured" may mean that "configuration information (e.g., information element(s) or parameter(s)) for the operation and/or information indicating to perform the operation is signaled". "Information element(s) (e.g., parameter(s)) are configured" may mean that "corresponding information element(s) are signaled". The signaling may be at least one of system information (SI) signaling (e.g., transmission of system information block (SIB) and/or master information block (MIB)), RRC signaling (e.g., transmission of RRC parameters and/or higher layer parameters), MAC control element (CE) signaling, or PHY signaling (e.g., transmission of downlink control information (DCI), uplink control information (UCI), and/or sidelink control information (SCI)).

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. In addition, the communication system 100 may further comprise a core network (e.g., a serving gateway (S-GW), a packet data network (PDN) gateway (P-GW), and a mobility management entity (MME)). When the communication system 100 is a 5G communication system (e.g., new radio (NR) system), the core network may include an access and mobility management function (AMF), a user plane function (UPF), a session management function (SMF), and the like.

The plurality of communication nodes 110 to 130 may support a communication protocol defined by the 3rd generation partnership project (3GPP) specifications (e.g., LTE communication protocol, LTE-A communication protocol, NR communication protocol, or the like). The plurality of communication nodes 110 to 130 may support code division multiple access (CDMA) technology, wideband CDMA (WCDMA) technology, time division multiple access (TDMA) technology, frequency division multiple access (FDMA) technology, orthogonal frequency division multiplexing (OFDM) technology, filtered OFDM technology, cyclic prefix OFDM (CP-OFDM) technology, discrete Fourier transform-spread-OFDM (DFT-s-OFDM) technology, orthogonal frequency division multiple access (OFDMA) technology, single carrier FDMA (SC-FDMA) technology, non-orthogonal multiple access (NOMA) technology, generalized frequency division multiplexing (GFDM) technology, filter band multi-carrier (FBMC) technology, universal filtered multi-carrier (UFMC) technology, space division multiple access (SDMA) technology, or the like. Each of the plurality of communication nodes may have the following structure.

Figure 2:
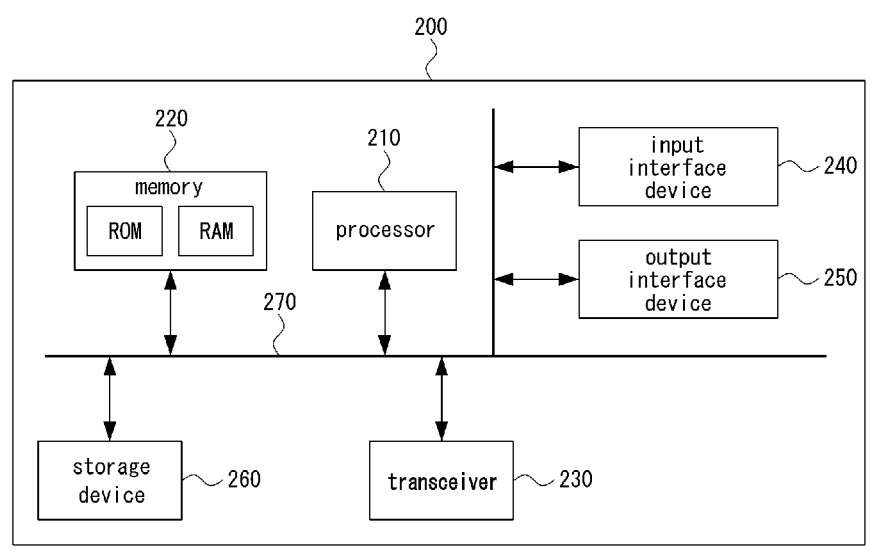
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B (NB), a evolved Node-B (eNB), a gNB, an advanced base station (ABS), a high reliability-base station (HR-BS), a base transceiver station (BTS), a radio base station, a radio transceiver, an access point, an access node, a radio access station (RAS), a mobile multihop relay-base station (MMR-BS), a relay station (RS), an advanced relay station (ARS), a high reliability-relay station (HR-RS), a home NodeB (HNB), a home eNodeB (HeNB), a road side unit (RSU), a radio remote head (RRH), a transmission point (TP), a transmission and reception point (TRP), or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on-board unit (OBU), or the like.

Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, device-to-device (D2D) communication (or, proximity services (ProSe)), Internet of Things (IoT) communications, dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, the communication system may support three types of frame structures. A type 1 frame structure may be applied to a frequency division duplex (FDD) communication system, a type 2 frame structure may be applied to a time division duplex (TDD) communication system, and a type 3 frame structure may be applied to an unlicensed band based communication system (e.g., a licensed assisted access (LAA) communication system).

Figure 3:
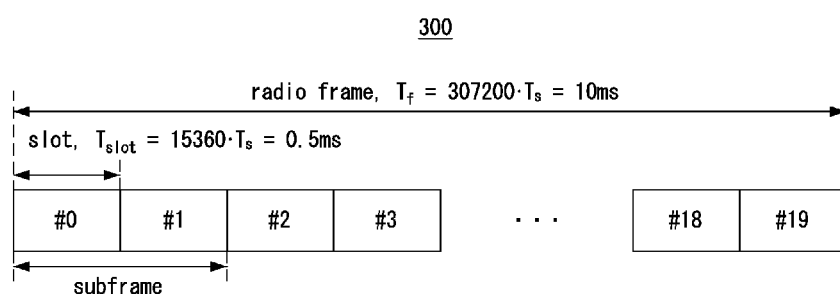
FIG. 3 is a conceptual diagram illustrating a first exemplary embodiment of a type 1 frame.

FIG. 3 is a conceptual diagram illustrating a first exemplary embodiment of a type 1 frame.

Referring to FIG. 3, a radio frame 300 may comprise 10 subframes, and a subframe may comprise 2 slots. Thus, the radio frame 300 may comprise 20 slots (e.g., slot #0, slot #1, slot #2, slot #3, . . . , slot #18, and slot #19). The length $T_f$ of the radio frame 300 may be 10 milliseconds (ms). The length of the subframe may be 1 ms, and the length $T_{slot}$ of a slot may be 0.5 ms. Here, $T_s$ may indicate a sampling time, and may be $1/30,720,000$s.

The slot may be composed of a plurality of OFDM symbols in the time domain, and may be composed of a plurality of resource blocks (RBs) in the frequency domain. The RB may be composed of a plurality of subcarriers in the frequency domain. The number of OFDM symbols constituting the slot may vary depending on configuration of a cyclic prefix (CP). The CP may be classified into a normal CP and an extended CP. If the normal CP is used, the slot may be composed of 7 OFDM symbols, in which case the subframe may be composed of 14 OFDM symbols. If the extended CP is used, the slot may be composed of 6 OFDM symbols, in which case the subframe may be composed of 12 OFDM symbols.

Figure 4:
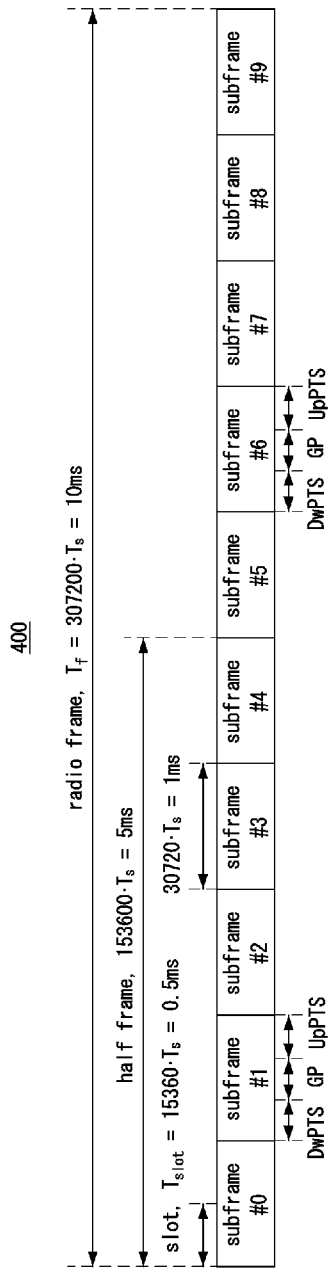
FIG. 4 is a conceptual diagram illustrating a first exemplary embodiment of a type 2 frame.

FIG. 4 is a conceptual diagram illustrating a first exemplary embodiment of a type 2 frame.

Referring to FIG. 4, a radio frame 400 may comprise two half frames, and a half frame may comprise 5 subframes. Thus, the radio frame 400 may comprise 10 subframes. The length $T_f$ of the radio frame 400 may be 10 ms. The length of the half frame may be 5 ms. The length of the subframe may be 1 ms. Here, $T_s$ may be $1/30,720,000$s.

The radio frame 400 may include at least one downlink subframe, at least one uplink subframe, and a least one special subframe. Each of the downlink subframe and the uplink subframe may include two slots. The length $T_{slot}$ of a slot may be 0.5 ms. Among the subframes included in the radio frame 400, each of the subframe #1 and the subframe #6 may be a special subframe. For example, when a switching periodicity between downlink and uplink is 5 ms, the radio frame 400 may include 2 special subframes. Alternatively, the switching periodicity between downlink and uplink is 10 ms, the radio frame 400 may include one special subframe. The special subframe may include a downlink pilot time slot (DwPTS), a guard period (GP), and an uplink pilot time slot (UpPTS).

The downlink pilot time slot may be regarded as a downlink interval and may be used for cell search, time and frequency synchronization acquisition of the terminal, channel estimation, and the like. The guard period may be used for resolving interference problems of uplink data transmission caused by delay of downlink data reception. Also, the guard period may include a time required for switching from the downlink data reception operation to the uplink data transmission operation. The uplink pilot time slot may be used for uplink channel estimation, time and frequency synchronization acquisition, and the like. Transmission of a physical random access channel (PRACH) or a sounding reference signal (SRS) may be performed in the uplink pilot time slot.

The lengths of the downlink pilot time slot, the guard period, and the uplink pilot time slot included in the special subframe may be variably adjusted as needed. In addition, the number and position of each of the downlink subframe, the uplink subframe, and the special subframe included in the radio frame 400 may be changed as needed.

In the communication system, a transmission time interval (TTI) may be a basic time unit for transmitting coded data through a physical layer. A short TTI may be used to support low latency requirements in the communication system. The length of the short TTI may be less than 1 ms. The conventional TTI having a length of 1 ms may be referred to as a base TTI or a regular TTI. That is, the base TTI may be composed of one subframe. In order to support transmission on a base TTI basis, signals and channels may be configured on a subframe basis. For example, a cell-specific reference signal (CRS), a physical downlink control channel (PDCCH), a physical downlink shared channel (PDSCH), a physical uplink control channel (PUCCH), a physical uplink shared channel (PUSCH), and the like may exist in each subframe.

On the other hand, a synchronization signal (e.g., a primary synchronization signal (PSS) and a secondary synchronization signal (SSS)) may exist for every 5 subframes, and a physical broadcast channel (PBCH) may exist for every 10 subframes. Also, each radio frame may be identified by an SFN, and the SFN may be used for defining transmission of a signal (e.g., a paging signal, a reference signal for channel estimation, a signal for channel state information, etc.) longer than one radio frame. The periodicity of the SFN may be 1024.

In the LTE system, the PBCH may be a physical layer channel used for transmission of system information (e.g., master information block (MIB)). The PBCH may be transmitted every 10 subframes. That is, the transmission periodicity of the PBCH may be 10 ms, and the PBCH may be transmitted once in the radio frame. The same MIB may be transmitted during 4 consecutive radio frames, and after 4 consecutive radio frames, the MIB may be changed according to a situation of the LTE system. The transmission period for which the same MIB is transmitted may be referred to as a 'PBCH TTI', and the PBCH TTI may be 40 ms. That is, the MIB may be changed for each PBCH TTI.

The MIB may be composed of 40 bits. Among the 40 bits constituting the MIB, 3 bits may be used to indicate a system band, 3 bits may be used to indicate physical hybrid automatic repeat request (ARQ) indicator channel (PHICH) related information, 8 bits may be used to indicate an SFN, 10 bits may be configured as reserved bits, and 16 bits may be used for a cyclic redundancy check (CRC).

The SFN for identifying the radio frame may be composed of a total of 10 bits (B9 to B0), and the most significant bits (MSBs) 8 bits (B9 to B2) among the 10 bits may be indicated by the PBCH (i.e., MIB). The MSBs 8 bits (B9 to B2) of the SFN indicated by the PBCH (i.e., MIB) may be identical during 4 consecutive radio frames (i.e., PBCH TTI). The least significant bits (LSBs) 2 bits (B1 to B0) of the SFN may be changed during 4 consecutive radio frames (i.e., PBCH TTI), and may not be explicitly indicated by the PBCH (i.e., MIB). The LSBs (2 bits (B1 to B0)) of the SFN may be implicitly indicated by a scrambling sequence of the PBCH (hereinafter referred to as 'PBCH scrambling sequence').

A gold sequence generated by being initialized by a cell ID may be used as the PBCH scrambling sequence, and the PBCH scrambling sequence may be initialized for each four consecutive radio frames (e.g., each PBCH TTI) based on an operation of 'mod (SFN, 4)'. The PBCH transmitted in a radio frame corresponding to an SFN with LSBs 2 bits (B1 to B0) set to '00' may be scrambled by the gold sequence generated by being initialized by the cell ID. Thereafter, the gold sequences generated according to the operation of 'mod (SFN, 4)' may be used to scramble the PBCH transmitted in the radio frames corresponding to SFNs with LSBs 2 bits (B1 to B0) set to '01', '10', and '11'.

Accordingly, the terminal having acquired the cell ID in the initial cell search process may identify the value of the LSBs 2 bits (B1 to B0) of the SFN (e.g., '00', '01', '10', or '11') based on the PBCH scramble sequence obtained in the decoding process for the PBCH (i.e., MIB). The terminal may use the LSBs 2 bits (B1 to B0) of the SFN obtained based on the PBCH scrambling sequence and the MSBs 8 bits (B9 to B2) of the SFN indicated by the PBCH (i.e., MIB) so as to identify the SFN (i.e., the entire bits B9 to B0 of the SFN).

On the other hand, the communication system may support not only a high transmission rate but also technical requirements for various service scenarios. For example, the communication system may support an enhanced mobile broadband (eMBB) service, an ultra-reliable low-latency communication (URLLC) service, a massive machine type communication (mMTC) service, and the like.

The subcarrier spacing of the communication system (e.g., OFDM-based communication system) may be determined based on a carrier frequency offset (CFO) and the like. The CFO may be generated by a Doppler effect, a phase drift, or the like, and may increase in proportion to an operation frequency. Therefore, in order to prevent the performance degradation of the communication system due to the CFO, the subcarrier spacing may increase in proportion to the operation frequency. On the other hand, as the subcarrier spacing increases, a CP overhead may increase. Therefore, the subcarrier spacing may be configured based on a channel characteristic, a radio frequency (RF) characteristic, etc. according to a frequency band.

The communication system may support numerologies defined in Table 1 below.

TABLE 1

| Numerology ($\mu$) | 0 | 1 | 2 | 3 | 4 | 5 |
|---|---|---|---|---|---|---|
| Subcarrier spacing | 15 kHz | 30 kHz | 60 kHz | 120 kHz | 240 kHz | 480 kHz |
| OFDM symbol length [us] | 66.7 | 33.3 | 16.7 | 8.3 | 4.2 | 2.1 |

TABLE 1-continued

| Numerology (μ) | 0 | 1 | 2 | 3 | 4 | 5 |
|---|---|---|---|---|---|---|
| CP length [us] | 4.76 | 2.38 | 1.19 | 0.60 | 0.30 | 0.15 |
| Number of OFDM symbols within 1 ms | 14 | 28 | 56 | 112 | 224 | 448 |

For example, the subcarrier spacing of the communication system may be configured to 15 kHz, 30 kHz, 60 kHz, or 120 kHz. The subcarrier spacing of the LTE system may be 15 kHz, and the subcarrier spacing of the NR system may be 1, 2, 4, or 8 times the conventional subcarrier spacing of 15 kHz. If the subcarrier spacing increases by exponentiation units of 2 of the conventional subcarrier spacing, the frame structure can be easily designed.

The communication system may support FR1 as well as FR2. The FR2 may be classified into FR2-1 and FR2-2. The FR1 may be a frequency band of 6 GHz or below, the FR2-1 may be a frequency band of 24.25 to 52.6, and the FR2-2 may be a frequency band of 52.6 to 71 GHz. In an exemplary embodiment, the FR2 may be the FR2-1, the FR2-1, or a frequency band including the FR2-1 and FR2-2. In each of the FR1, FR2-1, and FR2-2, subcarrier spacings available for data transmission may be defined as shown in Table 2 below. In each of the FR1, the FR2-1, and the FR2-2, SCSs available for synchronization signal block (SSB) transmission may be defined as shown in Table 3 below. In each of the FR1, the FR2-1, and the FR2-2, SCSs available for RACH transmission (e.g., Msg1 or Msg-A) may be defined as shown in Table 4 below.

TABLE 2

| data | | |
|---|---|---|
| FR1 | FR2-1 | FR2-2 |
| 15 kHz, 30 kHz, 60 kHz (optional) | 60 kHz, 120 kHz | 120 kHz, 480 kHz, 960 kHz |

TABLE 3

| SSB | | |
|---|---|---|
| FR1 | FR2-1 | FR2-2 |
| 15 kHz, 30 kHz | 120 kHz, 240 kHz | 120 kHz, 480 kHz, 960 kHz |

| RACH | | |
|---|---|---|
| FR1 | FR2-1 | FR2-2 |
| 1.25 kHz, 5 kHz, 15 kHz, 30 kHz | 60 kHz, 120 kHz | 120 kHz, 480 kHz, 960 kHz |

The communication system may support a wide frequency band (e.g., several hundred MHz to tens of GHz). Since the diffraction characteristic and the reflection characteristic of the radio wave are poor in a high frequency band, a propagation loss (e.g., path loss, reflection loss, and the like) in a high frequency band may be larger than a propagation loss in a low frequency band. Therefore, a cell coverage of a communication system supporting a high frequency band may be smaller than a cell coverage of a communication system supporting a low frequency band. In order to solve such the problem, a beamforming scheme based on a plurality of antenna elements may be used to increase the cell coverage in the communication system supporting a high frequency band.

The beamforming scheme may include a digital beamforming scheme, an analog beamforming scheme, a hybrid beamforming scheme, and the like. In the communication system using the digital beamforming scheme, a beamforming gain may be obtained using a plurality of RF paths based on a digital precoder or a codebook. In the communication system using the analog beamforming scheme, a beamforming gain may be obtained using analog RF devices (e.g., phase shifter, power amplifier (PA), variable gain amplifier (VGA), and the like) and an antenna array.

Because of the need for expensive digital to analog converters (DACs) or analog to digital converters (ADCs) for digital beamforming schemes and transceiver units corresponding to the number of antenna elements, the complexity of antenna implementation may be increased to increase the beamforming gain. In case of the communication system using the analog beamforming scheme, since a plurality of antenna elements are connected to one transceiver unit through phase shifters, the complexity of the antenna implementation may not increase greatly even if the beamforming gain is increased. However, the beamforming performance of the communication system using the analog beamforming scheme may be lower than the beamforming performance of the communication system using the digital beamforming scheme. Further, in the communication system using the analog beamforming scheme, since the phase shifter is adjusted in the time domain, frequency resources may not be efficiently used. Therefore, a hybrid beam forming scheme, which is a combination of the digital scheme and the analog scheme, may be used.

When the cell coverage is increased by the use of the beamforming scheme, common control channels and common signals (e.g., reference signal and synchronization signal) for all terminals belonging to the cell coverage as well as control channels and data channels for each terminal may also be transmitted based on the beamforming scheme. In this case, the common control channels and the common signals for all terminals belonging to the cell coverage may be transmitted based on a beam sweeping scheme.

In addition, in the NR system, a synchronization signal/physical broadcast channel (SS/PBCH) block may also be transmitted in a beam sweeping scheme. The SS/PBCH block may be composed of a PSS, an SSS, a PBCH, and the like. In the SS/PBCH block, the PSS, the SSS, and the PBCH may be configured in a time division multiplexing (TDM) manner. The SS/PBCH block may be referred also to as an 'SS block (SSB)'. One SS/PBCH block may be transmitted using N consecutive OFDM symbols. Here, N may be an integer equal to or greater than 4. The base station may periodically transmit the SS/PBCH block, and the terminal may acquire frequency/time synchronization, a cell ID, system information, and the like based on the SS/PBCH block received from the base station. The SS/PBCH block may be transmitted as follows.

Figure 5:
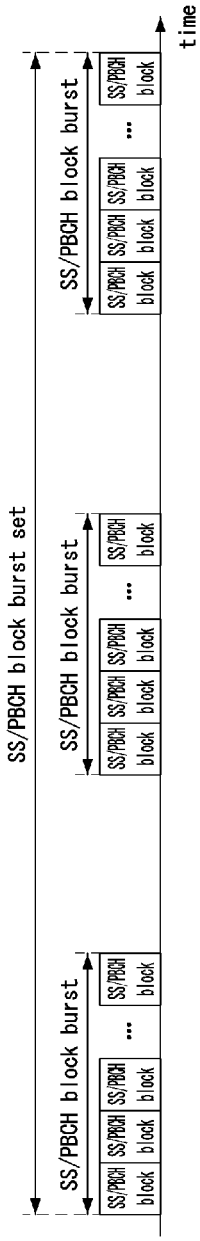
FIG. 5 is a conceptual diagram illustrating a first exemplary embodiment of a transmission method of SS/PBCH block in a communication system.

FIG. 5 is a conceptual diagram illustrating a first exemplary embodiment of a transmission method of SS/PBCH block in a communication system.

Referring to FIG. 5, one or more SS/PBCH blocks may be transmitted in a beam sweeping scheme within an SS/PBCH block burst set. Up to L SS/PBCH blocks may be transmitted within one SS/PBCH block burst set. L may be an integer equal to or greater than 2, and may be defined in the 3GPP standard. Depending on a region of a system frequency, L may vary. Within the SS/PBCH block burst set, the SS/PBCH blocks may be located consecutively or distributedly. The consecutive SS/PBCH blocks may be referred to as an 'SS/PBCH block burst'. The SS/PBCH block burst set may be repeated periodically, and system information (e.g., MIB) transmitted through the PBCHs of the SS/PBCH blocks within the SS/PBCH block burst set may be the same. An index of the SS/PBCH block, an index of the SS/PBCH block burst, an index of an OFDM symbol, an index of a slot, and the like may be indicated explicitly or implicitly by the PBCH.

Figure 6:
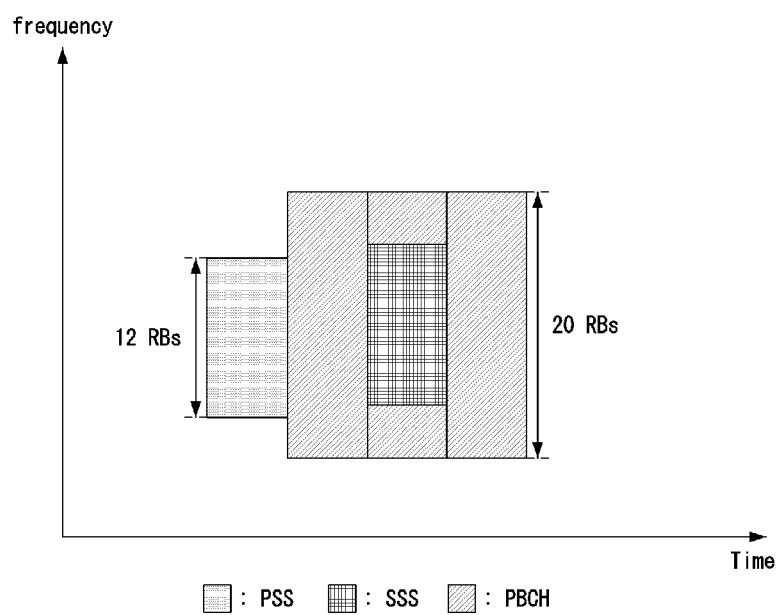
FIG. 6 is a conceptual diagram illustrating a first exemplary embodiment of an SS/PBCH block in a communication system.

FIG. 6 is a conceptual diagram illustrating a first exemplary embodiment of an SS/PBCH block in a communication system.

Referring to FIG. 6, signals and a channel are arranged within one SS/PBCH block in the order of 'PSS→PBCH→SSS→PBCH'. The PSS, SSS, and PBCH within the SS/PBCH block may be configured in a TDM scheme. In a symbol where the SSS is located, the PBCH may be located in frequency resources above the SSS and frequency resources below the SSS. That is, the PBCH may be transmitted in both end bands adjacent to the frequency band in which the SSS is transmitted. When the maximum number of SS/PBCH blocks is 8 in the sub 6 GHz frequency band, an SS/PBCH block index may be identified based on a demodulation reference signal used for demodulating the PBCH (hereinafter, referred to as 'PBCH DMRS'). When the maximum number of SSBs is 64 in the over 6 GHz frequency band, LSB 3 bits of 6 bits representing the SS/PBCH block index may be identified based on the PBCH DMRS, and the remaining MSB 3 bits may be identified based on a payload of the PBCH.

The maximum system bandwidth that can be supported in the NR system may be 400 MHz. The size of the maximum bandwidth that can be supported by the terminal may vary depending on the capability of the terminal. Therefore, the terminal may perform an initial access procedure (e.g., initial connection procedure) by using some of the system bandwidth of the NR system supporting a wide band. In order to support access procedures of terminals supporting various sizes of bandwidths, SS/PBCH blocks may be multiplexed in the frequency domain within the system bandwidth of the NR system supporting a wide band. In this case, the SS/PBCH blocks may be transmitted as follows.

Figure 7:
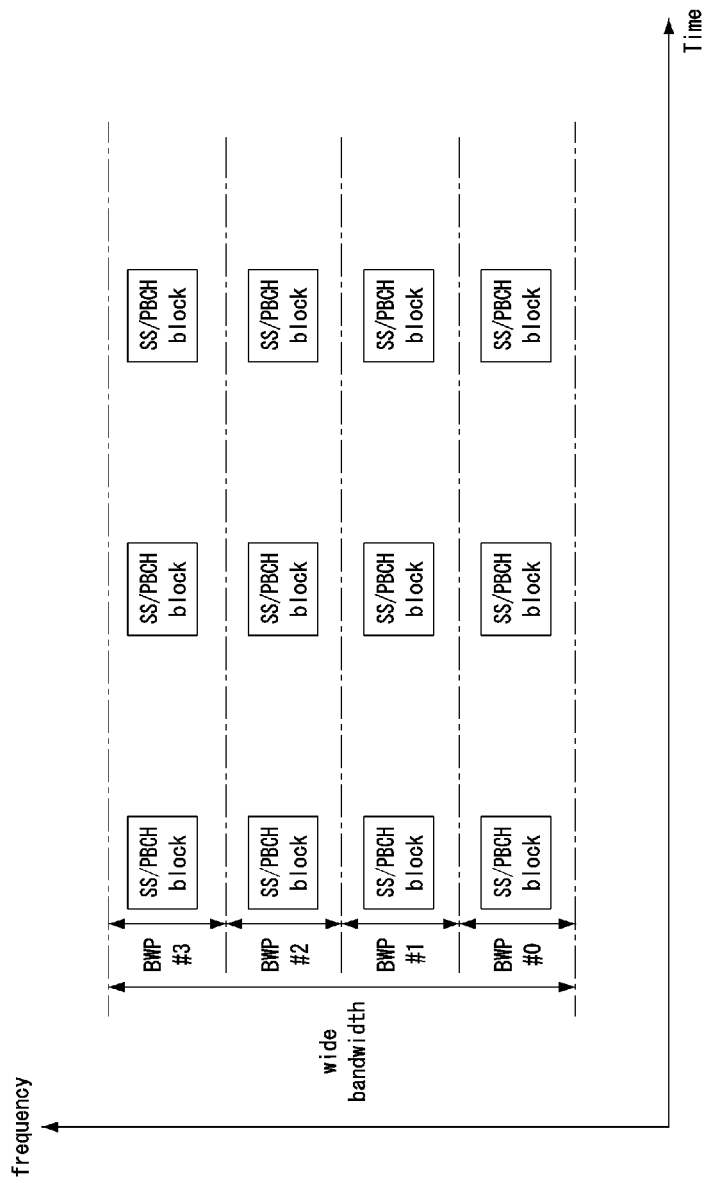
FIG. 7 is a conceptual diagram illustrating a second exemplary embodiment of a method of transmitting SS/PBCH blocks in a communication system.

FIG. 7 is a conceptual diagram illustrating a second exemplary embodiment of a method of transmitting SS/PBCH blocks in a communication system.

Referring to FIG. 7, a wideband component carrier (CC) may include a plurality of bandwidth parts (BWPs). For example, the wideband CC may include 4 BWPs. The base station may transmit SS/PBCH blocks in the respective BWPs #0 to #3 belonging to the wideband CC. The terminal may receive the SS/PBCH block(s) from one or more BWPs of the BWPs #0 to #3, and may perform an initial access procedure using the received SS/PBCH block.

After detecting the SS/PBCH block, the terminal may acquire system information (e.g., remaining minimum system information (RMSI)), and may perform a cell access procedure based on the system information. The RMSI may be transmitted on a PDSCH scheduled by a PDCCH. Configuration information of a control resource set (CORESET) in which the PDCCH including scheduling information of the PDSCH through which the RMSI is transmitted may be transmitted on a PBCH within the SS/PBCH block. A plurality of SS/PBCH blocks may be transmitted in the entire system band, and one or more SS/PBCH blocks among the plurality of SS/PBCH blocks may be SS/PBCH block(s) associated with the RMSI. The remaining SS/PBCH blocks may not be associated with the RMSI. The SS/PBCH block associated with the RMSI may be defined as a 'cell defining SS/PBCH block'. The terminal may perform a cell search procedure and an initial access procedure by using the cell-defining SS/PBCH block. The SS/PBCH block not associated with the RMSI may be used for a synchronization procedure and/or a measurement procedure in the corresponding BWP. The BWP(s) through which the SS/PBCH block is transmitted may be limited to one or more BWPs within a wide bandwidth.

The positions at which the SSBs are transmitted in the time domain may be defined differently according to an SCS and a value of L. In exemplary embodiments, the SCS may mean a subcarrier size. The SSB may be transmitted in some symbols within one slot, and a short UL transmission (e.g., uplink control information (UCI) transmission) may be performed in the remaining symbols not used for the SSB transmission within one slot. When the SSB is transmitted in radio resources to which a large SCS (e.g., 120 kHz SCS or 240 kHz SCS) is applied, a gap may be configured in the middle of consecutive slots including the SSB so that a long UL transmission (e.g., transmission of URLLC traffic) can be performed at least every 1 ms.

Figure 8:
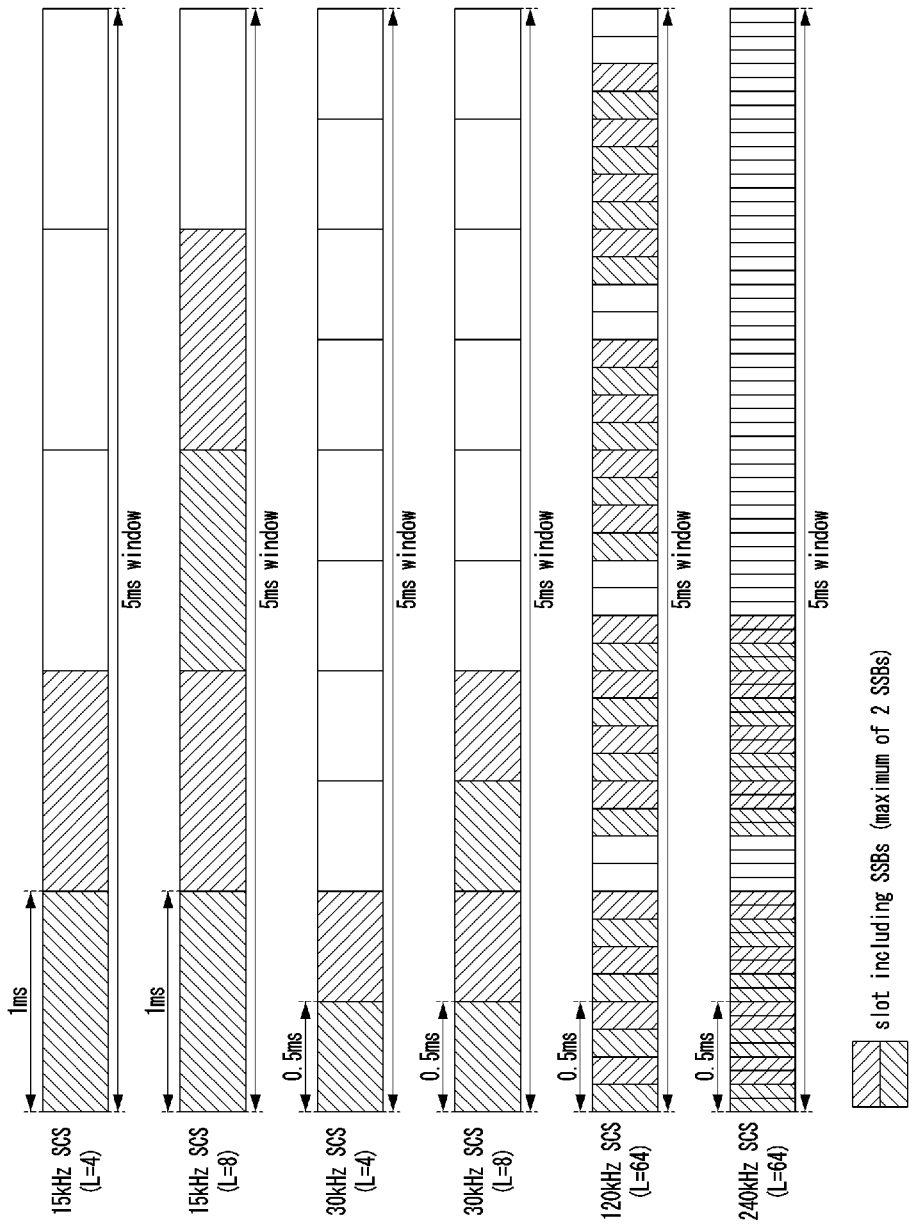
FIG. 8 is a conceptual diagram illustrating a first exemplary embodiment of SSB burst configuration.

FIG. 8 is a conceptual diagram illustrating a first exemplary embodiment of SSB burst configuration.

Referring to FIG. 8, in a transmission procedure of SSBs (e.g., SSB burst) in radio resources to which a 120 kHz SCS is applied, the base station may transmit SSBs in 8 consecutive slots. In a transmission procedure of SSBs in radio resources to which s 240 kHz SCS is applied, the base station may transmit SSBs in 16 consecutive slots. In the radio resources to which the 120 kHz SCS or 240 kHz SCS is applied, a gap for UL transmission may be configured.

The RMSI may be obtained by performing an operation to obtain configuration information of a CORESET from the SS/PBCH block (e.g., PBCH), an operation of detecting a PDCCH based on the configuration information of the CORESET, an operation to obtain scheduling information of a PDSCH from the PDCCH, and an operation to receive the RMSI on the PDSCH. A transmission resource of the PDCCH may be configured by the configuration information of the CORESET. A mapping patter of the RMSI CORESET pattern may be defined as follows. The RMSI CORESET may be a CORESET used for transmission and reception of the RMSI.

Figure 9A:
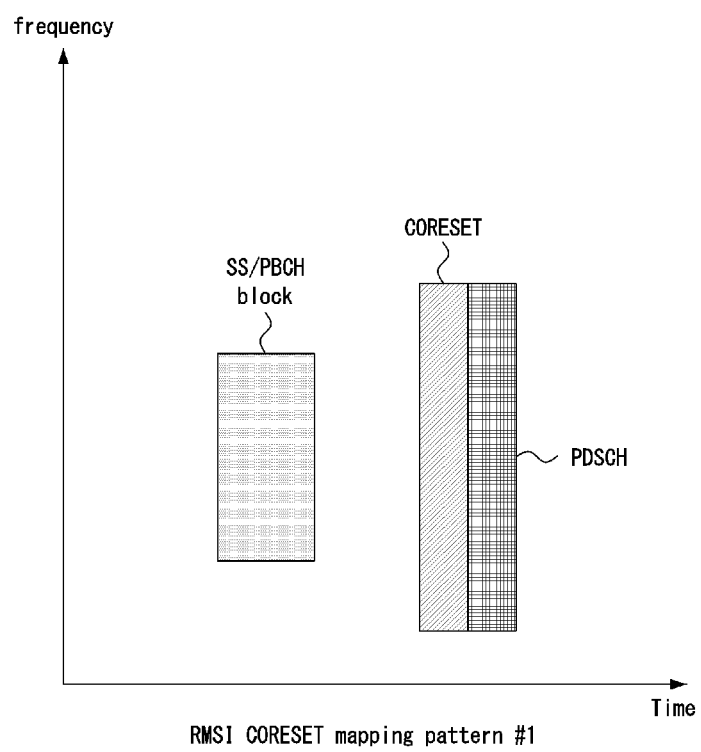
FIG. 9A is a conceptual diagram illustrating an RMSI CORESET mapping pattern #1 in a communication system.
Figure 9B:
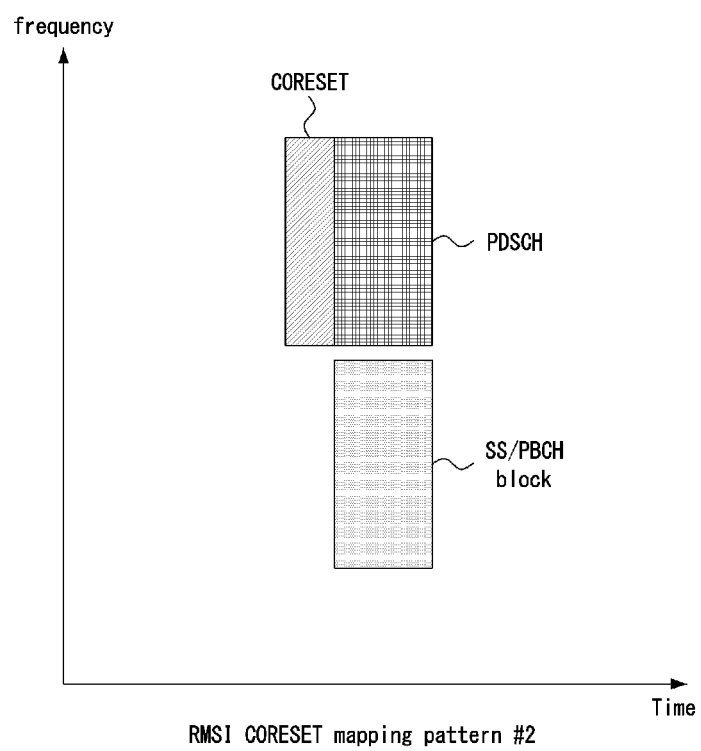
FIG. 9B is a conceptual diagram illustrating an RMSI CORESET mapping pattern #2 in a communication system.
Figure 9C:
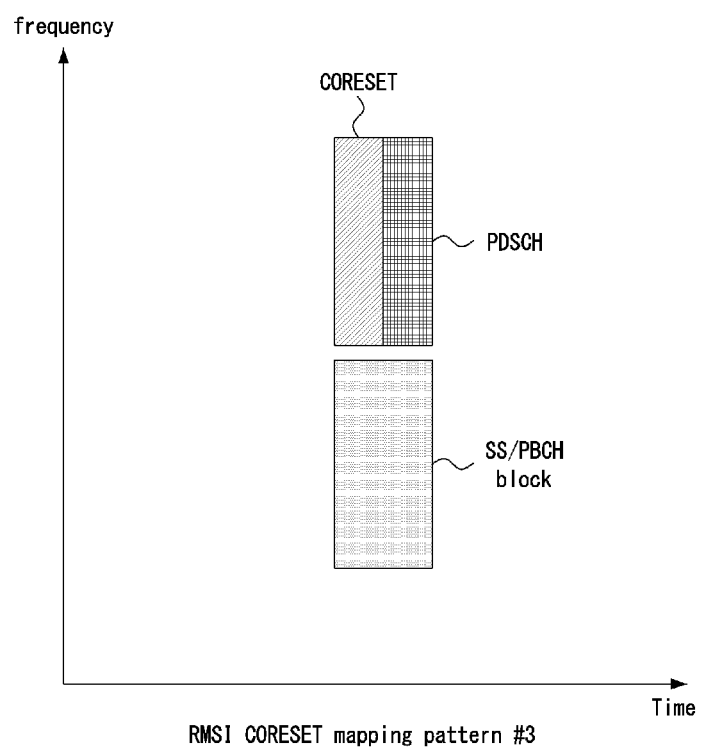
FIG. 9C is a conceptual diagram illustrating an RMSI CORESET mapping pattern #3 in a communication system.

FIG. 9A is a conceptual diagram illustrating an RMSI CORESET mapping pattern #1 in a communication system, FIG. 9B is a conceptual diagram illustrating an RMSI CORESET mapping pattern #2 in a communication system, and FIG. 9C is a conceptual diagram illustrating an RMSI CORESET mapping pattern #3 in a communication system.

Referring to FIGS. 9A to 9C, one RMSI CORESET mapping pattern among the RMSI CORESET mapping patterns #1 to #3 may be used, and a detailed configuration according to the one RMSI CORESET mapping pattern may be determined. In the RMSI CORESET mapping pattern #1, the SS/PBCH block, the CORESET (i.e., RMSI CORESET), and the PDSCH (i.e., RMSI PDSCH) may be configured in a TDM scheme. The RMSI PDSCH may mean the PDSCH through which the RMSI is transmitted. In the RMSI CORESET mapping pattern #2, the CORESET (i.e., RMSI CORESET) and the PDSCH (i.e., RMSI PDSCH) may be configured in a TDM scheme, and the PDSCH (i.e., RMSI PDSCH) and the SS/PBCH block may be configured in a frequency division multiplexing (FDM) scheme. In the RMSI CORESET mapping pattern #3, the CORESET (i.e., RMSI CORESET) and the PDSCH (i.e., RMSI PDSCH) may be configured in a TDM scheme, and the CORESET (i.e., RMSI CORESET) and the PDSCH (i.e., RMSI PDSCH) may be multiplexed with the SS/PBCH block in a FDM scheme.

In the frequency band of 6 GHz or below, only the RMSI CORESET mapping pattern #1 may be used. In the frequency band of 6 GHz or above, all of the RMSI CORESET mapping patterns #1, #2, and #3 may be used. The numerology of the SS/PBCH block may be different from that of the RMSI CORESET and the RMSI PDSCH. Here, the numerology may be a subcarrier spacing. In the RMSI CORESET mapping pattern #1, a combination of all numerologies may be used. In the RMSI CORESET mapping pattern #2, a combination of numerologies (120 kHz, 60 kHz) or (240 kHz, 120 kHz) may be used for the SS/PBCH block and the RMSI CORESET/PDSCH. In the RMSI CORESET mapping pattern #3, a combination of numerologies (120 kHz, 120 kHz) may be used for the SS/PBCH block and the RMSI CORESET/PDSCH.

One RMSI CORESET mapping pattern may be selected from the RMSI CORESET mapping patterns #1 to #3 according to the combination of the numerology of the SS/PBCH block and the numerology of the RMSI CORESET/PDSCH. The configuration information of the RMSI CORESET may include Table A and Table B. Table A may represent the number of resource blocks (RB s) of the RMSI CORESET, the number of symbols of the RMSI CORESET, and an offset between an RB (e.g., starting RB or ending RB) of the SS/PBCH block and an RB (e.g., starting RB or ending RB) of the RMSI CORESET. Table B may represent the number of search space sets per slot, an offset of the RMSI CORESET, and an OFDM symbol index in each of the RMSI CORESET mapping patterns. Table B may represent information for configuring a monitoring occasion of the RMSI PDCCH. Each of Table A and Table B may be composed of a plurality of sub-tables. For example, Table A may include sub-tables 13-1 to 13-8 defined in the technical specification (TS) 38.213, and Table B may include sub-tables 13-9 to 13-13 defined in the TS 38.213. The size of each of Table A and Table B may be 4 bits.

In the NR system, a PDSCH may be mapped to the time domain according to a PDSCH mapping type A or a PDSCH mapping type B. The PDSCH mapping types A and B may be defined as Table 5 below.

symbol of a PDSCH may be configured to one of 0 to 12. When the type B and the normal CP are used, the number of symbols constituting the PDSCH (e.g., the duration of the PDSCH) may be configured to one of {2, 4, 7} within a range not exceeding a slot boundary. A DMRS (hereinafter, referred to as 'PDSCH DMRS') for demodulation of the PDSCH (e.g., data) may be determined by a value of ID indicating the PDSCH mapping type (e.g., type A or type B) and the length. The ID may be defined differently according to the PDSCH mapping type.

Meanwhile, NR-unlicensed (NR-U) is being discussed in the NR standardization meeting. The NR-U system may increase network capacity by improving the utilization of limited frequency resources. The NR-U system may support operation in an unlicensed band (e.g., unlicensed spectrum).

In the NR-U system, the terminal may determine whether a signal is transmitted from a base station based on a discovery reference signal (DRS) received from the corresponding base station in the same manner as in the general NR system. In the NR-U system in a Stand-Alone (SA) mode, the terminal may acquire synchronization and/or system information based on the DRS. In the NR-U system, the DRS may be transmitted according to a regulation of the unlicensed band (e.g., transmission band, transmission power, transmission time, etc.). For example, according to Occupied Channel Bandwidth (OCB) regulations, signals may be configured and/or transmitted to occupy 80% of the total channel bandwidth (e.g., 20 MHz).

In the NR-U system, a communication node (e.g., base station, terminal) may perform a Listen Before Talk (LBT) procedure before transmitting a signal and/or a channel for coexistence with another system. The signal may be a synchronization signal, a reference signal (e.g., DRS, DMRS, channel state information (CSI)-RS, phase tracking (PT)-RS, sounding reference signal (SRS)), or the like. The channel may be a downlink channel, an uplink channel, a sidelink channel, or the like. In exemplary embodiments, a signal may mean the 'signal', the 'channel', or the 'signal and channel'. The LBT procedure may be an operation for checking whether a signal is transmitted by another communication node. If it is determined by the LBT procedure that there is no transmission signal (e.g., when the LBT procedure is successful), the communication node may transmit a signal in the unlicensed band. If it is determined by the LBT procedure that a transmission signal exists (e.g.,

TABLE 5

| PDSCH mapping type | Normal CP | | | Extended CP | | |
|---|---|---|---|---|---|---|
| | S | L | S + L | S | L | S + L |
| Type A | {0, 1, 2, 3} (Note 1) | {3, ... , 14} | {3, ... , 14} | {0, 1, 2, 3} (Note 1) | {3, ... , 12} | {3, ... , 12} |
| Type B | {0, ... , 12} | {2, 4, 7} | {2, ... , 14} | {0, ... , 10} | {2, 4, 6} | {2, ... , 12} |

Note
1: S=3 is applicable only if dmrs-TypeA-Position = 3

The type A (i.e., PDSCH mapping type A) may be slot-based transmission. When the type A is used, a position of a start symbol of a PDSCH may be configured to one of {0, 1, 2, 3}. When the type A and a normal CP are used, the number of symbols constituting the PDSCH (e.g., the duration of the PDSCH) may be configured to one of 3 to 14 within a range not exceeding a slot boundary. The type B (i.e., PDSCH mapping type B) may be non-slot-based transmission. When the type B is used, a position of a start when the LBT fails), the communication node may not be able to transmit a signal in the unlicensed band. The communication node may perform a LBT procedure according to one of various categories before transmission of a signal. The category of LBT may vary depending on the type of the transmission signal.

Meanwhile, NR vehicle-to-everything (V2X) communication technology is being discussed in the NR standardization meeting. The NR V2X communication technology may be a technology that supports communication between vehicles, communication between a vehicle and an infrastructure, communication between a vehicle and a pedestrian, and the like based on device-to-device (D2D) communication technologies.

The NR V2X communication (e.g., sidelink communication) may be performed according to three transmission schemes (e.g., unicast scheme, broadcast scheme, groupcast scheme). When the unicast scheme is used, a PC5-RRC connection may be established between a first terminal (e.g. transmitting terminal that transmits data) and a second terminal (e.g., receiving terminal that receives data), and the PC5-RRC connection may refer to a logical connection for a pair between a source ID of the first terminal and a destination ID of the second terminal. The first terminal may transmit data (e.g., sidelink data) to the second terminal. When the broadcast scheme is used, the first terminal may transmit data to all terminals. When the groupcast scheme is used, the first terminal may transmit data to a group (e.g., groupcast group) composed of a plurality of terminals.

When the unicast scheme is used, the second terminal may transmit feedback information (e.g., acknowledgment (ACK) or negative ACK (NACK)) to the first terminal in response to data received from the first terminal. In the exemplary embodiments below, the feedback information may be referred to as a 'HARQ-ACK', 'feedback signal', a 'physical sidelink feedback channel (PSFCH) signal', or the like. When ACK is received from the second terminal, the first terminal may determine that the data has been successfully received at the second terminal. When NACK is received from the second terminal, the first terminal may determine that the second terminal has failed to receive the data. In this case, the first terminal may transmit additional information to the second terminal based on an HARQ scheme. Alternatively, the first terminal may improve a reception probability of the data at the second terminal by retransmitting the same data to the second terminal.

When the broadcast scheme is used, a procedure for transmitting feedback information for data may not be performed. For example, system information may be transmitted in the broadcast scheme, and the terminal may not transmit feedback information for the system information to the base station. Therefore, the base station may not identify whether the system information has been successfully received at the terminal. To solve this problem, the base station may periodically broadcast the system information.

When the groupcast scheme is used, a procedure for transmitting feedback information for data may not be performed. For example, necessary information may be periodically transmitted in the groupcast scheme, without the procedure for transmitting feedback information. However, when the candidates of terminals participating in the groupcast scheme-based communication and/or the number of the terminals participating in that is limited, and the data transmitted in the groupcast scheme is data that should be received within a preconfigured time (e.g., data sensitive to delay), it may be necessary to transmit feedback information also in the groupcast sidelink communication. The groupcast sidelink communication may mean sidelink communication performed in the groupcast scheme. When the feedback information transmission procedure is performed in the groupcast sidelink communication, data can be transmitted and received efficiently and reliably.

In the groupcast sidelink communication, two HARQ-ACK feedback schemes (i.e., transmission procedures of feedback information) may be supported. When the number of receiving terminals in a sidelink group is large and a service scenario 1 is supported, some receiving terminals belonging to a specific range within the sidelink group may transmit NACK through a PSFCH when data reception fails. This scheme may be a groupcast HARQ-ACK feedback option 1. In the service scenario 1, instead of all the receiving terminals in the sidelink group, it may be allowed for some receiving terminals belonging to a specific range to perform reception in a best-effort manner. The service scenario 1 may be an extended sensor scenario in which some receiving terminals belonging to a specific range need to receive the same sensor information from a transmitting terminal. In exemplary embodiments, the transmitting terminal may refer to a terminal transmitting data, and the receiving terminal may refer to a terminal receiving data.

When the number of receiving terminals in the sidelink group is limited and a service scenario 2 is supported, each of all the receiving terminals belonging to the sidelink group may report HARQ-ACK for data individually through a separate PSFCH. This scheme may be a groupcast HARQ-ACK feedback option 2. In the service scenario 2, since PSFCH resources are sufficient, the transmitting terminal may perform monitoring on HARQ-ACK feedbacks of all the receiving terminals belonging to the sidelink group, and data reception may be guaranteed at all the receiving terminals belonging to the sidelink group.

In addition, data reliability at the receiving terminal may be improved by appropriately adjusting a transmit power of the transmitting terminal according to a transmission environment. Interference to other terminals may be mitigated by appropriately adjusting the transmit power of the transmitting terminal. Energy efficiency can be improved by reducing unnecessary transmit power. A power control scheme may be classified into an open-loop power control scheme and a closed-loop power control scheme. In the open-loop power control scheme, the transmitting terminal may determine the transmit power in consideration of configuration, a measured environment, etc. In the closed-loop power control scheme, the transmitting terminal may determine the transmit power based on a transmit power control (TPC) command received from the receiving terminal.

It may be difficult due to various causes including a multipath fading channel, interference, and the like to predict a received signal strength at the receiving terminal. Accordingly, the receiving terminal may adjust a receive power level (e.g., receive power range) by performing an automatic gain control (AGC) operation to prevent a quantization error of the received signal and maintain a proper receive power. In the communication system, the terminal may perform the AGC operation using a reference signal received from the base station. However, in the sidelink communication (e.g., V2X communication), the reference signal may not be transmitted from the base station. That is, in the sidelink communication, communication between terminals may be performed without the base station. Therefore, it may be difficult to perform the AGC operation in the sidelink communication. In the sidelink communication, the transmitting terminal may first transmit a signal (e.g., reference signal) to the receiving terminal before transmitting data, and the receiving terminal may adjust a receive power range (e.g., receive power level) by performing an AGC operation based on the signal received from the transmitting terminal. Thereafter, the transmitting terminal may transmit sidelink data to the receiving terminal. The signal used for the AGC operation may be a signal duplicated from a signal to be transmitted later or a signal preconfigured between the terminals.

A time period required for the ACG operation may be 15 µs. When a subcarrier spacing of 15 kHz is used in the NR system, a time period (e.g., length) of one symbol (e.g., OFDM symbol) may be 66.7 µs. When a subcarrier spacing of 30 kHz is used in the NR system, a time period of one symbol (e.g., OFDM symbol) may be 33.3 µs. In the following exemplary embodiments, a symbol may mean an OFDM symbol. That is, a time period of one symbol may be twice or more than a time period required for the ACG operation.

For sidelink communication, it may be necessary to transmit a data channel for data transmission and a control channel including scheduling information for data resource allocation. In sidelink communication, the data channel may be a physical sidelink shared channel (PSSCH), and the control channel may be a physical sidelink control channel (PSCCH). The data channel and the control channel may be multiplexed in a resource domain (e.g., time and frequency resource domains).

Figure 10:
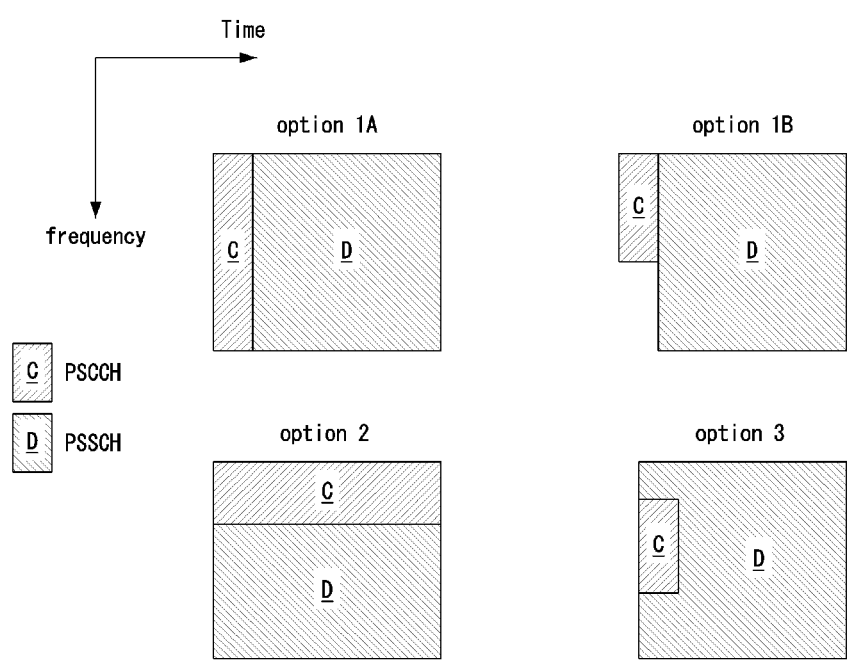
FIG. 10 is a conceptual diagram illustrating exemplary embodiments of a method for multiplexing a control channel and a data channel in sidelink communication.

FIG. 10 is a conceptual diagram illustrating exemplary embodiments of a method for multiplexing a control channel and a data channel in sidelink communication.

Referring to FIG. 10, sidelink communication may support an option 1A, an option 1B, an option 2, and an option 3. When the option 1A and/or the option 1B is supported, a control channel and a data channel may be multiplexed in the time domain. When the option 2 is supported, a control channel and a data channel may be multiplexed in the frequency domain. When the option 3 is supported, a control channel and a data channel may be multiplexed in the time and frequency domains. The sidelink communication may basically support the option 3.

In the sidelink communication (e.g., NR-V2X sidelink communication), a basic unit of resource configuration may be a subchannel. The subchannel may be defined with time and frequency resources. For example, the subchannel may be composed of a plurality of symbols (e.g., OFDM symbols) in the time domain, and may be composed of a plurality of resource blocks (RBs) in the frequency domain. The subchannel may be referred to as an RB set. In the subchannel, a data channel and a control channel may be multiplexed based on the option 3.

In the sidelink communication (e.g., NR-V2X sidelink communication), transmission resources may be allocated based on a mode 1 or a mode 2. When the mode 1 is used, a base station may allocate sidelink resource(s) for data transmission within a resource pool to a transmitting terminal, and the transmitting terminal may transmit data to a receiving terminal using the sidelink resource(s) allocated by the base station. Here, the transmitting terminal may be a terminal that transmits data in sidelink communication, and the receiving terminal may be a terminal that receives the data in sidelink communication.

When the mode 2 is used, a transmitting terminal may autonomously select sidelink resource(s) to be used for data transmission by performing a resource sensing operation and/or a resource selection operation within a resource pool. The base station may configure the resource pool for the mode 1 and the resource pool for the mode 2 to the terminal(s). The resource pool for the mode 1 may be configured independently from the resource pool for the mode 2. Alternatively, a common resource pool may be configured for the mode 1 and the mode 2.

When the mode 1 is used, the base station may schedule a resource used for sidelink data transmission to the transmitting terminal, and the transmitting terminal may transmit sidelink data to the receiving terminal by using the resource scheduled by the base station. Therefore, a resource conflict between terminals may be prevented. When the mode 2 is used, the transmitting terminal may select an arbitrary resource by performing a resource sensing operation and/or resource selection operation, and may transmit sidelink data by using the selected arbitrary resource. Since the above-described procedure is performed based on an individual resource sensing operation and/or resource selection operation of each transmitting terminal, a conflict between selected resources may occur.

The sidelink communication system supporting Release-16 may be designed for terminals (e.g., vehicle-mounted terminals, vehicle UEs (V-UEs)) that do not have restrictions on battery capacity. Therefore, a power saving issue may not be greatly considered in resource sensing/selection operations for such the terminals. However, in order to perform sidelink communication with terminals having restrictions on battery capacity in the sidelink communication system supporting Release-17 (e.g., a terminal carried by a pedestrian, a terminal mounted on a bicycle, a terminal mounted on a motorcycle, a pedestrian UE (P-UE)), power saving methods will be required. In the present disclosure, a 'V-UE' may refer to a terminal that has no significant restrictions on battery capacity, a T-UE' may refer to a terminal with restrictions on battery capacity, and a 'resource sensing/selection operation' may refer to a resource sensing operation and/or a resource selection operation. The resource sensing operation may refer to a partial sensing operation or a full sensing operation. The resource selection operation may refer to a random selection operation. In addition, in the present disclosure, an 'operation of a terminal' may be interpreted as an 'operation of a V-UE' and/or 'operation of a P-UE'.

For power saving in the LTE V2X, a partial sensing operation and/or a random selection operation has been introduced. When the partial sensing operation is supported, the terminal may perform resource sensing operations in partial periods instead of an entire period within a sensing window, and may select a resource based on a result of the partial sensing operation. According to such the operation, power consumption of the terminal may be reduced. When the random selection operation is supported, the terminal may randomly select a resource without performing the resource sensing operation. Alternatively, the random selection operation may be performed together with the resource sensing operation. For example, the terminal may determine resources by performing the resource sensing operation, and may select a resource(s) by performing the random selection operation within the determined resources.

In the LTE V2X supporting Release-14, a resource pool in which the partial sensing operation and/or random selection operation can be performed may be configured independently of a resource pool in which the full sensing operation can be performed. A resource pool capable of performing the random selection operation, a resource pool capable of performing the partial sensing operation, and a resource pool capable of performing the full sensing operation may be independently configured. The terminal may select resources by performing the random selection operation, the partial sensing operation, and/or the full sensing operation in the resource pool(s). The terminal may select one operation among the random selection operation and the partial sensing operation, may select a resource(s) by performing the selected sensing operation, and may perform sidelink communication by using the selected resource(s).

In the LTE V2X supporting Release-14, sidelink (SL) data may be periodically transmitted based on a broadcast scheme. In the NR communication system, SL data may be transmitted based on a broadcast scheme, multicast scheme, groupcast scheme, or unicast scheme. In addition, in the NR communication system, SL data may be transmitted periodically or aperiodically. A transmitting terminal may transmit SL data to a receiving terminal, and the receiving terminal may transmit a HARQ feedback (e.g., acknowledgement (ACK) or negative ACK (NACK)) for the SL data to the transmitting terminal on a PSFCH. In the present disclosure, a transmitting terminal may refer to a terminal transmitting SL data, and a receiving terminal may refer to a terminal receiving the SL data.

A terminal having reduced capability (hereinafter, referred to as 'RedCap terminal') may operate in a specific usage environment. The capability of the RedCap terminal may be lower than capability of a new radio (NR) normal terminal, and may be higher than those of an LTE-machine type communication (LTE-MTC) terminal, a narrow band (NB)-Internet of things (IoT) terminal, and a low power wide area (LPWA) terminal. For example, a terminal (e.g., surveillance camera) requiring a high data rate and not high latency condition and/or a terminal (e.g., wearable device) requiring a non-high data rate, high latency condition, and high reliability may exist. In order to support the above-described terminals, the maximum carrier bandwidth in FR1 may be reduced from 100 MHz to 20 MHz, and the maximum carrier bandwidth in FR2 may be reduced from 400 MHz to 100 MHz. The number of reception antennas of the RedCap terminal may be smaller than the number of reception antennas of the NR normal terminal. When the carrier bandwidth and the number of reception antennas are reduced, reception performance in the RedCap terminal may decrease, and accordingly, the coverage of the RedCap terminal may decrease.

Hereinafter, methods for initial access in a communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

A communication system (e.g., NR system) may operate in a frequency band higher than a 52.6 GHz frequency band. As the frequency band in which the communication system operates increases, a frequency offset error and a phase noise may increase. The use of a large SCS may be required for robust operations in these environments. In the FR2 band, 60 kHz SCS and/or 120 kHz SCS may be supported, and further 480 kHz SCS and/or 960 kHz SCS may be supported. In addition, a physical layer signal and channel design and a physical layer procedure according to the new SCS(s) may be required. Regarding an initial access procedure, a 120 kHz SSB and/or 240 kHz SSB may be supported in the FR2 band, and additional introduction of 480 kHz SSB and/or 960 kHz SSB is being discussed. Here, the 480 kHz SSB may mean an SSB transmitted in radio resources to which 480 kHz SCS is applied. In order to support the new SCS(s), an initial BWP configuration method, an initial access related signal and channel design method, and an initial access procedure may be required.

In the communication system supporting FR1, a long sequence format of a PRACH preamble may support 1.25 kHz SCS and/or 5 kHz SCS. If the communication system supports both FR1 and FR2, a short sequence format in FR1 may support 15 kHz SCS and/or 30 kHz SCS, and a short sequence format in FR2 may support 60 kHz SCS and/or 120 kHz SCS. In a frequency band of 52.6 GHz or above, an SCS greater than the above-described SCSs may be used. In this case, it may be necessary to improve the initial access procedure using a PRACH preamble (e.g., random access (RA) preamble). In a Type-1 RA procedure, the terminal may receive a Msg2 (e.g., RAR) from the base station on a PDSCH within an RAR window after transmitting an RA preamble. In this case, the terminal may obtain scheduling information of the PDSCH (i.e., PDSCH on which the Msg2 is received) through DCI scrambled by an RA-RNTI. The base station and/or the terminal may determine (e.g., calculate) the RA-RNTI according to a RACH occasion (RO) in which the RA preamble is transmitted/received as shown in Equation 1 below.

$$\text{RA-RNTI}=1+s\_id+14 \times t\_id+14 \times 80 \times f\_id+14 \times 80 \times 8 \times ul\_carrier\_id \qquad \text{[Equation 1]}$$

In Equation 1, $s\_id$ ($0 \leq s\_id < 14$) may indicate an index of the first symbol of the RO, and $t\_id$ ($0 \leq t\_id < 80$) may indicate an index of the first slot (e.g., start slot) of the RO within a system frame. In exemplary embodiments, a symbol may mean an OFDM symbol. $t\_id$ may be determined according to an SCS. $f\_id$ ($0 \leq f\_id < 8$) may indicate an index of the RO in the frequency domain, and $ul\_carrier\_id$ may indicate a UL carrier in which the PRACH preamble is transmitted. When the UL carrier in which the PRACH preamble is transmitted is a normal uplink (NUL), $ul\_carrier\_id$ may be set to 0. When the UL carrier in which the PRACH preamble is transmitted is a supplementary uplink (SUL), $ul\_carrier\_id$ may be set to 1. In a Type-2 RA procedure, the base station and/or the terminal may determine an MSGB-RNTI according to an RO in which a Msg-A is transmitted/received as shown in Equation 2 below. The MSGB-RNTI may be used for scrambling of a DCI including scheduling information of a Msg-B.

$$\text{MSGB-RNTI}=1+s\_id+14 \times t\_id+14 \times 80 \times f\_id+14 \times 80 \times 8 \times ul\_carrier\_id+14 \times 80 \times 8 \times 2 \qquad \text{[Equation 2]}$$

Meanings of $s\_id$, $t\_id$, $f\_id$, and $ul\_carrier\_id$ in Equation 2 may be the same as those of $s\_id$, $t\_id$, $f\_id$, and $ul\_carrier\_id$ in Equation 1. In order to distinguish the Type-1 RA procedure from the Type-2 RA procedure, Equation 2 may further include '14×80×8×2' compared to Equation 1. Each of the RA-RNTI and MSGB-RNTI may be determined according to the RO (e.g., time and frequency resource index of the RO) in which the PRACH preamble is transmitted. In Equations 1 and 2, $t\_id$ may indicate the index of the first slot (e.g., start slot) of the RO within the system frame, and may be determined according to the SCS. When the length of one system frame is 10 ms and 15 kHz SCS is used, one system frame may include 10 slots, and an index of each slot may be one of 0 to 9. When the length of one system frame is 10 ms and 30 kHz SCS is used, an index of each slot may be one of 0 to 19. When the length of one system frame is 10 ms and 60 kHz SCS is used, an index of each slot may be one of 0 to 39. When the length of one system frame is 10 ms and 120 kHz SCS is used, an index of each slot may be one of 0 to 79. A range of the RNTI calculated through Equations 1 and 2 may be defined as shown in Table 6 below.

TABLE 6

| Start value | End value | RNTI | UL carrier |
|---|---|---|---|
| 1 | 8960 | RA-RNTI | NUL |
| 8961 | 17920 | RA-RNTI | SUL |
| 17921 | 26880 | MSGB-RNTI | NUL |
| 26881 | 35840 | MSGB-RNTI | SUL |

In the communication system, the RNTI may be set to a value of 00001 to 65535, a value of 65520 to 65533 may be reserved for other purposes, 65534 may be defined to be used for a paging (P)-RNTI, and 65535 may be defined to be used for a system information (SI)-RNTI. The RNTIs including RA-RNTI and MSGB-RNTI may be set to values within 00001 to 65519. The RA-RNTI and the MSGB-RNTI may be set within the values defined in Table 6. When an SCS greater than 120 kHz SCS is used, the number of slots within one system frame may exceed 80. For example, when 960 kHz SCS is used, the number of slots within one system frame may be 640. In order to determine a non-overlapping RNTI value in consideration of the above, the base station and/or the terminal may use Equations 3 and 4 below.

$$\text{RA-RNTI}=1+s\_id+14\times t\_id+14\times t\_id\_max\times f\_id+14\times t\_id\_max\times 8\times ul\_carrier\_id \quad \text{[Equation 3]}$$

$$\text{MSGB-RNTI}=1+s\_id+14\times t\_id+14\times t\_id\_max\times f\_id+14\times t\_id\_max\times 8\times ul\_carrier\_id+14\times t\_id\_max\times 8\times 2 \quad \text{[Equation 4]}$$

In Equations 3 and 4, t_id_max may be the number of slots within a system frame according to the SCS. When 240 kHz SCS is used, 160 slots may exist within one system frame. When 480 kHz SCS is used, 320 slots may exist within one system frame. When 960 kHz SCS is used, 640 slots may exist within one system frame. When calculating an RNTI value for 960 kHz SCS based on Equations above, the maximum value of RA-RNTI may be 143360, and the maximum value of MSGB-RNTI may be 286720. In this case, each of RA-RNTI and MSGB-RNTI may exceed a configurable value. Therefore, methods for solving the problem that each of the calculated RA-RNTI and the calculated MSGB-RNTI exceed configurable values as the SCS increases are needed. As the SCS increases, the number of slots included within one system frame may increase, and as the number of slots increases, each of the calculated RA-RNTI and the calculated MSGB-RNTI may exceed a configurable value. In order to solve this problem, a modulo operation may be applied in Equations for RNTI calculation. The base station and/or the terminal may calculate the RA-RNTI using Equation 5 below, and may calculate the MSGB-RNTI using Equation 6 below.

$$\text{RA-RNTI}=(1+s\_id+14\times t\_id+14\times t\_id\_max\times f\_id+14\times t\_id\_max\times 8\times ul\_carrier\_id)\bmod 2^{16} \quad \text{[Equation 5]}$$

$$\text{MSGB-RNTI}=(1+s\_id+14\times t\_id+14\times t\_id\_max\times f\_id+14\times t\_id\_max\times 8\times ul\_carrier\_id+14\times t\_id\_max\times 8\times 2)\bmod 2^{16} \quad \text{[Equation 6]}$$

Equation 5 may be an equation obtained by adding a modulo operation to Equation 3, and Equation 6 may be an equation obtained by adding a modulo operation to Equation 4. According to Equations 5 and 6, the problem that the calculated RNTI exceeds a configurable value can be solved. The RNTI calculated through the modulo operation may not be set beyond a maximum of $2^{16}$. When the value to which the modulo operation is applied is set to $2^{16}$, the RNTI calculated by Equation 5 or 6 may be a value corresponding to P-RNTI, SI-RNTI, and reserved RNTI. In order to solve this problem, the value to which the modulo operation is applied is set to 65520 instead of $2^{16}$, which is the maximum value that the remaining RNTIs may have, excluding values corresponding to P-RNTI, SI-RNTI, and/or reserve RNTI. The base station and/or the terminal may calculate the RA-RNTI using Equation 7 below, and may calculate the MSGB-RNTI using Equation 8 below.

$$\text{RA-RNTI}=(1+s\_id+14\times t\_id+14\times t\_id\_max\times f\_id+14\times t\_id\_max\times 8\times ul\_carrier\_id)\bmod 65520 \quad \text{[Equation 7]}$$

$$\text{MSGB-RNTI}=(1+s\_id+14\times t\_id+14\times t\_id\_max\times f\_id+14\times t\_id\_max\times 8\times ul\_carrier\_id+14\times t\_id\_max\times 8\times 2)\bmod 65520 \quad \text{[Equation 8]}$$

In Equations 7 and 8, the value to which the modulo operation is applied may be 65520 instead of $2^{16}$. In this case, the RNTI calculated by Equations 7 and 8 may fall within an allowable range. However, the RNTIs calculated in Equations 7 and 8 may overlap each other. A method of limiting other parameters (e.g., s_id, t_id, and/or f_id) may be used instead of the modulo operation so that the calculated RNTI does not exceed an allowable range. Specifically, when s_id is limited, the position of the first symbol of the RO may be limited to a specific range (e.g., symbols #0 to #6), even-numbered symbols, or odd-numbered symbols. The RNTI may be calculated based on the above-mentioned constraints. For example, when s_id is limited to even-numbered symbols, the base station and/or the terminal may calculate the RA-RNTI based on Equation 9 below.

$$\text{RA-RNTI}=1+\text{floor}(s\_id/2)+(s\_id\_max/2)\times t\_id+(s\_id\_max/2)\times t\_id\_max\times f\_id+(s\_id\_max/2)\times t\_id\_max\times 8\times ul\_carrier\_id \quad \text{[Equation 9]}$$

s_id of Equation 3 may be replaced with floor (s_id/2) in Equation 9. In this case, since a range of floor (s_id/2) is 0 to 6, the RA-RNTI may be calculated using s_id_max/2(=7) instead of s_id_max(=14). Alternatively, the range of the calculated RNTI may be limited by limiting the position of the slot within the system frame. The position of the first slot (e.g., start slot) of the RO within the system frame may be limited to a specific range (e.g., slots #0 to #(t_id_max/2−1)), even-numbered slots, or odd-numbered slots. The RNTI may be calculated based on the above-mentioned constraints. For example, when t_id is limited to even-numbered slots, the base station and/or the terminal may calculate the RA-RNTI based on Equation 10 below.

$$\text{RA-RNTI}=1+s\_id+14\times\text{floor}(t\_id/2)+14\times(t\_id\_max/2)\times f\_id+14\times(t\_id\_max/2)\times 8\times ul\_carrier\_id \quad \text{[Equation 10]}$$

Since the position of the first slot (e.g., start slot) of the RO is limited to an even-numbered slot, f_id in Equation 3 may be replaced with floor (f_id/2) in Equation 10. Therefore, considering the range of floor (f_id/2), the RA-RNTI may be calculated using (t_id_max/2) instead of t_id_max.

When the position of the first slot (e.g., start slot) of the RO within the system frame is limited to a specific slot within the system frame, a method of applying the index of the restricted specific slot to Equation for RA-RNTI calculation may be used. Instead of the above-mentioned limited specific slot, an index of a reference slot considering a reference SCS selected from the existing SCS(s) may be applied to Equation for RA-RNTI (or MSGB-RNTI) calculation. The above-described existing SCS(s) may be smaller than the SCS actually used. For example, the reference SCS may be 60 kHz SCS or 120 kHz SCS.

Figure 11A:
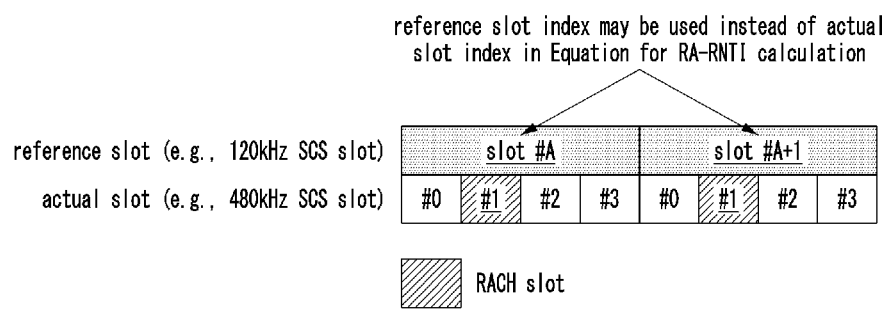
FIG. 11A is a conceptual diagram illustrating a first exemplary embodiment of a PRACH slot configuration having a reference PRACH slot.
Figure 11B:
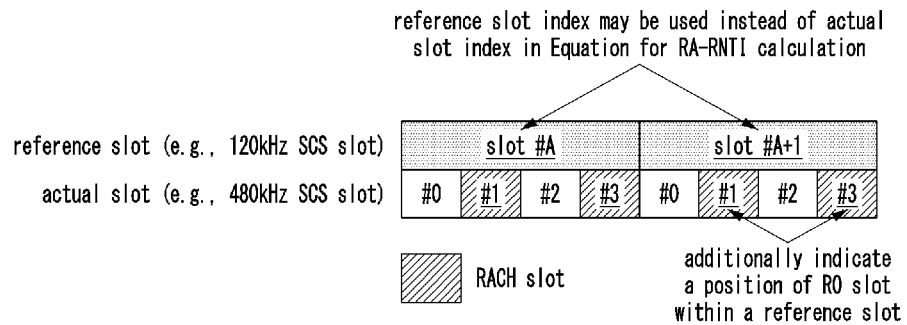
FIG. 11B is a conceptual diagram illustrating a second exemplary embodiment of a PRACH slot configuration having a reference PRACH slot.

FIG. 11A is a conceptual diagram illustrating a first exemplary embodiment of a PRACH slot configuration having a reference PRACH slot, and FIG. 11B is a conceptual diagram illustrating a second exemplary embodiment of a PRACH slot configuration having a reference PRACH slot.

Referring to FIGS. 11A and 11B, one reference slot in radio resources to which 120 kHz SCS is applied may include four actual slots in radio resources to which 480 kHz SCS is applied. The actual slots may mean slots actually used for the RA procedure. That is, the RA procedure may be performed in the radio resources to which 480 kHz SCS is applied, and in the RA procedure, the RA-RNTI or MSGB-RNTI may be calculated based on the index of the reference slot in the radio resources to which the reference SCS (e.g., 60 kHz SCS or 120 kHz SCS) is applied. The reference slot may be referred to as 'RO reference slot' or 'reference RO slot'. Each of the four actual slots may be referred to as 'RO actual slot' or 'actual RO slot'. In the exemplary embodiment shown in FIG. 11A, when only the second slot among four 480 kHz SCS slots is limited to the start slot of the RO, the reference slot index (hereinafter, '120 kHz SCS slot index') considering 120 kHz, that is the reference SCS, may be applied in Equation for calculating the RA-RNTI (or MSGB-RNTI). In this case, Equation 1 may be used as it is. The exemplary embodiments shown in FIGS. 11A and 11B may be applied in the same or similar manner even when the reference SCS is 60 kHz SCS. The 480 kHz SCS slot may mean a slot in radio resources to which 480 kHz SCS is applied.

The above-described exemplary embodiment may be an exemplary embodiment of using one specific actual slot selected from among actual slots included in the reference slot in consideration of the reference SCS. Alternatively, a plurality of specific actual slots selected from among the actual slots belonging to the reference slot may be used. In this case, when the reference slot index is applied to Equation 1, the same RA-RNTI may be redundantly generated for ROs configured in the plurality of specific actual slots. Therefore, when a plurality of specific actual slots within one reference slot are configured as the slot (e.g., start slot) of the RO, an indicator for distinguishing each of the plurality of specific actual slots may be transmitted on a PDCCH scrambled by the RA-RNTI.

In the exemplary embodiment shown in FIG. 11B, there may be four actual slots within one reference slot, and among the four actual slots, the second actual slot (e.g., actual slot #1) or the fourth actual slot (e.g., actual slot #3) may be configured as the slot (e.g., start slot) of the RO. In this case, the same RA-RNTI (or MSGB-RNTI) may be generated in consideration of the reference slot index, but the base station may signal (or configure) the slot (e.g., the second slot or the fourth slot) of the RO to the terminal by transmitting the additional indicator to the terminal. Here, the additional indicator may be transmitted on the PDCCH scrambled by the RA-RNTI (or MSGB-RNTI). The number of bits for the above-described indicator may be changed according to the number of actual slots that can be configured as the slot of the RO (e.g., start slot of the RO) within the reference slot. In the above-described exemplary embodiment, since two actual slots (e.g., the second actual slot and the fourth actual slot) within the reference slot can be configured as the slot of the RO, the number of bits for the indicator may be 1.

When all four actual slots within the reference slot can be configured as the slot of the RO, the number of bits for the indicator may be 2. When the number of actual slots included in the reference slots exceeds 4, many bits may be required for the indicator. The above-described method may be a method of applying the reference slot index instead of the RACH slot index (e.g., PRACH slot index) to Equation 1. When the RACH slot index and the floor operation are used, the same effect as that of the above-described method may be achieved. When floor (t_id/num_ratio) is used instead of t_id in Equation 1, the same effect as that of the above-described method may be achieved. In this case, t_id may be the actual RACH slot index rather than the reference slot index, and num_ratio may indicate a ratio between a numerology of the actual RACH slot and a numerology of the reference slot. In the exemplary embodiment shown in FIGS. 11A and 11B, num_ratio may be 4 (=480 kHz/120 kHz). In the Type-2 RA procedure, the MSGB-RNTI may be generated through Equation 2, and a specific actual slot used as the slot of the RO may be indicated by an indicator transmitted on a PDCCH. In the above-described exemplary embodiment, the reference SCS of 120 kHz SCS and the actual SCS of 480 kHz SCS are applied, but other reference SCS (e.g., 60 kHz SCS) and other actual SCS (e.g., 120 kHz SCS) may also be applied identically or similarly. Information (e.g., position information) of the slot of the RO according to the reference SCS and/or within the reference slot may be preconfigured by higher layer signaling (e.g., system information).

Alternatively, the number of ROs multiplexed in the frequency domain may be limited, and the range of RNTI may be limited according to the above-described limitation. The maximum number of ROs multiplexed in the frequency domain may be 8. The RNTI may be generated based on a constraint of f_id_max ($\leq 8$). For example, the base station and/or the terminal may calculate (e.g., generate) the RA-RNTI based on Equation 11 below.

$$\text{RA-RNTI}=1+s\_id+14 \times t\_id+14 \times t\_id\_max \times f\_id+14 \times t\_id\_max \times f\_id\_max \times ul\_carrier\_id \quad \text{[Equation 11]}$$

The maximum number f_id_max of ROs multiplexed in the frequency domain may be set to 4. In this case, the range of RNTI may be reduced. The range of RNTI when the maximum number of multiplexed ROs is 4 may be half the range of RNTI when the maximum number of multiplexed ROs is 8. A problem that the RNTI exceeds the allowable range may occur in up to 80 slots based on 120 kHz SCS within a system frame of 10 ms length. When an SCS greater than 120 kHz SCS is applied, the problem that the RNTI exceeds the allowable range may occur in more than 80 slots. For example, when 960 kHz SCS is used, the problem in which RNTI exceeds the allowable range may occur in 640 slots. In order to solve the above-mentioned problem, a modulo operation may be applied to t_id indicating a slot index within the system frame. The base station and/or the terminal may calculate the RA-RNTI based on Equation 12 below.

$$\text{RA-RNTI}=1+s\_id+14 \times (t\_id \bmod 80)+14 \times 80 \times f\_id+ 14 \times 80 \times 8 \times ul\_carrier\_id \quad \text{[Equation 12]}$$

Equation 12 may be obtained by adding a modulo operation to Equation 1. According to Equation 12, the range of t_id may be 0 to 79 regardless of the SCS. The effect of Equation 12 may be the same as an effect of a method of segmenting all slots within the system frame in units of 80 slots. When calculating the RNTI in the above-described manner, the same RNTI may be calculated for ROs having slots #0, #80, #160, . . . and the like. Therefore, it may not be possible to distinguish PRACH preambles transmitted in different ROs. A PDCCH scrambled by the RA-RNTI (or MSGB-RNTI) may include an indicator (e.g., group index) indicating a specific group among groups segmented in units of 80 slots within the system frame. Here, one group may include 80 slots.

Even when PDCCHs scrambled with the same RA-RNTI (or the same MSGB-RNTI) are received, the terminal may identify a position of a slot corresponding to an RO in which its PRACH preamble is transmitted, and may identify a PDCCH for itself among the received PDCCHs by comparing the identified position of the slot with groups indicated by the respective indicators included in the received PDCCHs. For example, when such the segment operation is performed in units of 80 slots within a system frame to which 480 kHz SCS is applied, four groups may be configured. The first group may include slots #0 to #79, the second group may include slots #80 to #159, the third group may include slots #160 to #239, and the fourth group may include slots #240 to #319. In this case, the base station may signal which group the slot (e.g., the slot (i.e., RO) in which the PRACH preamble is received) belongs by transmitting a 2-bit indicator on a PDCCH.

When such the segment operation is performed in units of 80 slots within a system frame to which 960 kHz SCS is applied, eight groups may be configured. In this case, the base station may signal which group the slot (e.g., the slot (i.e., RO) in which the PRACH preamble is received) belongs by transmitting a 3-bit indicator on a PDCCH. When groups in which the RO may exist are limited, the number of bits of the indicator required to indicate the group may be reduced. Alternatively, the position of the slot of the RO (e.g., start slot of the RO) may be limited so that the same RNTI is not generated. For example, the slot of the RO may be limited to one of slots #0 to #79. Alternatively, the slot of the RO may be limited within slots #0 to #19, slots #100 to #119, slots #200 to #219, or slots #300 to #319. According to the above-described limitation, the same RNTI may not be generated even when the slot index is substituted in Equation 12. The above-described exemplary embodiment may be a method of configuring so that the same RNTI is not generated when 480 kHz SCS is used. The above-described exemplary embodiment may be applied not only to 480 kHz SCS but also to other SCSs.

Equation 9, Equation 10, Equation 11, and Equation 12 may be equally or similarly applied to the MSGB-RNTI as well as the RA-RNTI. The range of RNTI may be limited by a combination of the above methods. The above-described RNTI may be limitedly applied to SCS(s) added in a new frequency band, and accordingly, the above-described RNTI may not overlap with the existing RA-RNTI and/or the existing MSGB-RNTI.

In the NR system supporting FR2, a 60 kHz SCS slot may be defined as a reference slot, and one or two RACH slots (e.g., PRACH slots) of 120 kHz SCS may be configured within the reference slot. When one RACH slot is configured in radio resources to which 120 kHz SCS is applied, the corresponding RACH slot may be configured as the second 120 kHz SCS slot among two 120 kHz SCS slots within the reference slot of 60 kHz SCS. The 120 kHz SCS slot may mean a slot configured in radio resources to which 120 kHz SCS is applied. When 60 kHz SCS is a reference SCS, the RA-RNTI (or MSGB-RNTI) may be calculated using an index of a 60 kHz SCS slot (e.g., reference slot). When 120 kHz SCS is a reference SCS, the RA-RNTI (or MSGB-RNTI) may be calculated using an index of a 120 kHz SCS slot (e.g., reference slot).

Since the communication system operating in a high frequency band supports an indoor hot spot area or a relatively small coverage, a large number of ROs may not need to be supported. Even when 480 kHz SCS and/or 960 kHz SCS greater than the conventional SCS (e.g., 120 kHz SCS) are used in a high frequency band, the same RO density as when the conventional SCS is used may be maintained. There may be four 480 kHz SCS slots within one 120 kHz SCS slot. There may be eight 960 kHz SCS slots within one 120 kHz SCS slot.

In order to maintain the same RO density in radio resources to which different SCSs are applied, it may be preferable that only one 480 kHz SCS RACH slot or one 960 kHz SCS RACH slot is configured within a 120 kHz SCS slot regardless of the SCS. The 480 kHz SCS RACH slot may be a slot (e.g., slot in which an RO is located) for PRACH preamble transmission in radio resource to which 480 kHz SCS is applied. When only one 120 kHz SCS RACH slot is configured within a 60 kHz SCS reference slot, the last 120 kHz SCS slot among two 120 kHz SCS slots within the 60 kHz SCS reference slot may be configured as the RACH slot. In the same or similar manner, the last 480 kHz SCS slot among four 480 kHz SCS slots within the 120 kHz SCS slot may be configured as the RACH slot, and the last 960 kHz SCS slot among eight 960 kHz SCS slots within the 120 kHz SCS slot may be configured as the RACH slot.

Figure 12A:
FIG. 12A is a conceptual diagram illustrating a third exemplary embodiment of a PRACH slot configuration having a reference PRACH slot.
Figure 12B:
FIG. 12B is a conceptual diagram illustrating a fourth exemplary embodiment of a PRACH slot configuration having a reference PRACH slot.

FIG. 12A is a conceptual diagram illustrating a third exemplary embodiment of a PRACH slot configuration having a reference PRACH slot, and FIG. 12B is a conceptual diagram illustrating a fourth exemplary embodiment of a PRACH slot configuration having a reference PRACH slot.

Referring to FIG. 12A, 480 kHz SCS slots #4A+3 and #4A+7 may be configured as RACH slots (e.g., PRACH slots), and 960 kHz SCS slots #8A+7 and #8A+15 may be configured as RACH slots. When the last 120 kHz SCS slot among two 120 kHz SCS slots within a 60 kHz SCS reference slot is configured as a RACH slot, the 480 kHz SCS slots #4A+7 and the 960 kHz SCS slots #8A+15 may be configured as RACH slots.

When the RACH slot(s) are configured based on the above-described method, the slot index t_id in Equation 1 (e.g., equation for RA-RNTI calculation) may be an index of the 120 kHz SCS slot to which the 480 kHz SCS slot or the 960 kHz SCS slot belongs, and the symbol index s_id may be an index of a start symbol (e.g., start OFDM symbol) of an RO within the actual 480 kHz SCS slot or actual 960 kHz SCS slot. As the SCS increases, a symbol period may decrease. Therefore, a beam switching operation and/or an LBT operation in an unlicensed band may not be performed within a CP period of a symbol. In order to solve this problem, unlike the method of continuously configuring ROs in the time domain, one or more symbols between ROs may be configured as a time gap for a beam switching operation and/or LBT operation. In this case, in order to maintain the same RO density for different SCSs, the method of configuring one 480 kHz SCS RACH slot or one 960 kHz SCS RACH slot within a 120 kHz SCS slot may be inappropriate.

According to a PRACH preamble format, a RACH duration in the time domain and the number of ROs included in a RACH slot may be defined. When consecutive ROs are configured without a time gap, all consecutive ROs may be configured within one RACH slot period. When a time gap having one or more symbols is configured between ROs, a length of 'ROs+time gap' may exceed one RACH slot period. For example, if a PRACH configuration index is 8 in Table 6.3.3.2-4 of TS 38.211, a PRACH preamble format A1 may be used, a start symbol of an RO within a RACH slot period is a symbol #0, #2, #4, #6, #8, or #10, one RO may occupy a period of 2 symbols, and 6 ROs may be configured within 12 symbols in the time domain. If a time gap having one symbol is configured between ROs and the time gap is configured between the remaining ROs except for the first RO, a start symbol of an RO may be symbols #0, #3, #6, #9, #12, or #15. If a time gap having one symbol is configured between ROs and the time gap is configured for all ROs, a start symbol of an RO may be symbols #1, #4, #5, #10, #13, or #16. In the above-described exemplary embodiment, a length of '6 ROs+time gap' may be out of a period including 14 symbols.

In order to solve this problem, an RO configuration method, an RA-RNTI calculation method, and a MSGB-RNTI calculation method in consideration of a time gap between ROs may be required. When a time gap between ROs is configured, an index of a start symbol of an RO may be calculated in consideration of the time gap, and when the ROs configured in consideration of the calculated index of the start symbol and a RACH duration are out of one slot period, the base station and/or the terminal may arrange the corresponding ROs in two slots. When the ROs are configured out of one slot period, the base station and/or the terminal may evenly arrange the corresponding ROs within two slots, and may identically apply the index of the start symbol of the RO within one slot to the index of the start symbol of the RO within the other slot. In this case, since two RACH slots are required, the last two slots among 480 kHz SCS slots and 960 kHz SCS slots belonging to the 120 kHz SCS slot may be configured as RACH slots.

Referring to FIG. 12B, among the 480 kHz SCS slots, slots #4A+2, #4A+3, #4A+6, and #4A+7 may be configured as RACH slots. Among the 960 kHz SCS slots, slots #8A+6, #8A+7, #8A+14, and #8A+15 may be configured as RACH slots. When 480 kHz SCS is applied, the start RACH slots may be the slots #4A+2 and #4A+6. When 960 kHz SCS is applied, the start RACH slots may be the slots #8A+6 and #8A+14. When the indexes of the start symbols are 1, 4, 7, 10, 13, and 16, the start symbol #1, #4, and #7 may be configured in the first slot among the two slots, and the start symbols #10, #13, and #16 may be configured in the second slot among the two slots. In this case, the indexes of the actual start symbols in the second slot may be set to 1, 4, and 7 in the same manner as in the first slot. According to the above-described method, when a time gap between ROs is configured, the problem that the length of 'ROs+time gap' exceeds one RACH slot period may be solved.

In this case, a problem does not occur because a 120 kHz SCS slot index is used in the RA-RNTI calculation procedure. Since the indexes of the start symbols are the same in the two slots, the values of RA-RNTI may collide. In order to prevent this problem, in the RA-RNTI calculation procedure, the start symbol index s_id in the first slot may be set to an actual value (e.g., 1, 4, 7), and the start symbol index s_id in the second slot may be set to an 'actual value (e.g., 1, 4, 7)+offset (e.g., 1)'. In this case, the start symbol index s_id in the second slot may be 2, 5, or 8. Accordingly, the start symbol index s_id in the first slot may be different from the start symbol index s_id in the second slot. Since the start symbol index s_id in the second slot is [2, 5, 8] instead of [1, 4, 7], it is possible to prevent duplicate RA-RNTI values from being generated.

Alternatively, the actual RO mapping position in the second slot may be set to symbols #2, #5, and #8 to which the offset is applied. In the above-described exemplary embodiment, the ROs may be evenly arranged within the two slots. Alternatively, the number of ROs arranged in each of the two slots may be different from each other. For example, if the start symbol index is 1, 4, 7, 10, 13, or 16 and the RACH duration is 2 symbols, the start symbols #1, #4, #7, and #10 may be configured in the first slot, and the start symbols #13 and #16 may be configured in the second slot. The values used in the first slot may be sequentially applied as indexes of actual start symbols. In this case, the index of the start symbol may be 1 or 4. In order to prevent a collision of RA-RNTI values in the above-described exemplary embodiment, an additional offset may be applied.

Since the communication system operating in a high frequency band supports a hot spot or a small coverage area, a relatively small number of ROs may be configured. As in the exemplary embodiment shown in FIG. 12A, a PRACH slot may be configured in the last slot of radio resources to which each SCS is applied, and an RO configurable within a period of the slot may be determined as a valid RO. For example, in slots #4A+3 and #A+7 among 480 kHz SCS slots and slots #8A+7 and #8A+15 among 960 kHz SCS slots, the ROs may be configured by applying the start symbol index of 1, 4, 7, or 10. If there is no time gap between ROs, four ROs may be configured within a RACH slot in the time domain. The above-described exemplary embodiment has been described based on a start symbol index when a time gap is configured also for the first RO. In addition, the above-described exemplary embodiment may be applied even when a time gap is configured only in the remaining ROs except for the first RO (e.g., when the start symbol index is 0, 3, 6, 9, 12, or 15).

Alternatively, the RA-RNTI (or MSGB-RNTI) may be calculated by applying a modulo operation to a symbol index in consideration of a time gap between ROs. Consecutive symbol indexes (e.g., 0, 3, 6, 9, 12, 15) in consideration of the time gap between ROs may be calculated through 'A mod B'. Here, A may be a symbol index, and B may be the number of symbols (e.g., 14) within one slot. A symbol index resulting from 'A mod B' may be calculated as 0, 3, 6, 9, 12, or 1. When the above-described values (e.g., result of 'A mod B') are used as they are without an additional procedure, generation of duplicate RA-RNTI values may be prevented. The symbol indexes of 0, 3, 6, 9, and 12 may be symbol indexes in the first slot, and the symbol index of 1 may be a symbol index in the second slot. In this case, the number of ROs that can be located within one slot may be limited according to the number of symbols occupied by the RO. Accordingly, in consideration of the number of ROs that can be configured according to an increase in the symbol index, an appropriate method for arranging ROs between two slots and a method for setting symbol indexes may be required.

For example, when one RO occupies four symbols, consecutive symbol indexes in consideration of a time gap between ROs may be 0, 5, 10, 15, 20, and 25. When consecutive symbol indexes are applied to the same modulo operation (e.g., 'A mod B'), symbol indexes resulting from the modulo operation may be 0, 4, 10, 1, 6, and 11. Since a symbol #11 is a possible symbol index within an actual slot, it may be configured as a start position of the RO. Considering the number (e.g., four) of symbols occupied by one RO, the RO may not be used substantially because it crosses a slot boundary. Therefore, a prior rule may be defined so that the terminal recognizes that the use of the corresponding RO is impossible. Also, the slot in which the RO cannot be used may be configured.

The above-described exemplary embodiments may be equally or similarly applied to the MSGB-RNTI as well as the RA-RNTI. In the exemplary embodiment shown in FIG. 12B, the last two slots in each of the 480 kHz SCS slots and the 960 kHz SCS slots belonging to the 120 kHz SCS slot may be allocated. Here, the two slots may be consecutive slots or non-consecutive slots. When two non-consecutive slots are allocated, in order for the base station to uniformly have a processing time for RACH reception, it may be preferable that slots (e.g., non-consecutive slots) in which the ROs are configured are equally spaced within the reference slot. For example, in the exemplary embodiment shown in FIG. 12B, slots #4A+1, #4A+3, #4A+5, and #4A+7 among the 480 kHz SCS slots and slots #8A+3, #8A+7, #8A+11, and #8A+15 # among the 960 kHz SCS slots may be non-consecutive slots configured according to the above-described exemplary embodiments.

As a frequency band becomes higher and the number of available SCCs increases, it may be required to increase the number of SSBs. In the communication system using beamforming to improve coverage in a high frequency band, it may be possible to transmit a plurality of SSBs for a beam sweeping operation to support an overall system coverage. In order to overcome characteristics of the high frequency band and an increased path loss as the frequency band becomes higher, the beamforming operation may be performed using narrower beams. In this case, a coverage area per beam may be reduced, and transmission using a large number of beams may be required to support the overall system coverage. Accordingly, the maximum number of transmittable SSBs (e.g., 64) may increase.

When a plurality of SSBs are transmitted, the terminal may identify a beam through which a corresponding SSB is transmitted based on an SSB index, and may perform an initial access operation and/or a beam management operation based on the identified beam. For example, the terminal may transmit a PRACH preamble in an RO associated with the identified beam (e.g., SSB index), and may calculate an RA-RNTI or MSGB-RNTI based on the RO. In the communication system, transmission of up to 8 SSBs in FR1 may be possible, and transmission of up to 64 SSBs in FR2 may be possible. In FR1, up to 8 SSB indexes may be signaled using a PBCH DMRS sequence. In FR2, up to 64 SSB indexes may be signaled using a PBCH DMRS sequence and a PBCH payload. LSB 3 bits of the SSB index may be indicated by a PBCH DMRS sequence, and MSB 3 bits of the SSB index may be indicated by a PBCH payload.

When the maximum number of transmittable SSBs increases, methods for signaling the increased number of SSB indexes may be required. In exemplary embodiment below, methods for signaling an SSB index when the maximum number of transmittable SSBs exceeds 64 will be proposed. An SCS for SSBs in the communication system may be predefined in advance except for some frequency bands. Therefore, when performing an initial access procedure in a frequency band, the terminal may perform an SSB detection operation based on a predefined SCS. The SCS for RMSI (e.g., SIB1) reception may be changed (e.g., indicated) by a 1-bit indicator of the PBCH payload. For example, when an SSB is transmitted in a frequency band to which 30 kHz SCS is applied, an SCS used for RMSI transmission in the corresponding frequency band may be changed to (or, indicated as) 15 kHz SCS using the 1-bit indicator of the PBCH payload. The SCS used for RMSI transmission may be applied to a PDSCH on which the RMSI is transmitted and/or a PDCCH (e.g., CORESET0) through which DCI scheduling the corresponding PDSCH is transmitted.

When an SSB is transmitted in a frequency band of FR2, to which 120 kHz SCS is applied, the SCS used for RMSI transmission in the corresponding frequency band may be changed to (or indicated as) 60 kHz SCS by using the 1-bit indicator of the PBCH payload. In order to support the NR system in a frequency band higher than FR2, 120 kHz SCS, 240 kHz SCS, 480 kHz SCS, and 960 kHz SCS may be used. Therefore, a combination of the SCS for SSB transmission (hereinafter referred to as 'SSB SCS') and the SCS for RMSI transmission (hereinafter referred to as 'RMSI SCS' or 'CORESET0 SCS') may vary. The number of combinations of the SSB SCS and the RMSI SCS may be limited, and the indicator for SCS change may be used for signaling of an SSB index.

Specifically, the SSB SCS and the RMSI SCS may always be configured to be the same. However, when a specific SCS is not supported, the RMSI SCS may be configured to be smaller than the SSB SCS. One RMSI SCS may be defined for each SSB SCS, and in this case, the indicator for SCS change may not be required. Table 7 below may indicate combinations of the SSB SCS and the RMSI SCS.

TABLE 7

| SSB SCS (kHz) | RMSI SCS (kHz) |
|---|---|
| 120 | 120 |
| 240 | 120 |
| 480 | 480 |
| 960 | 960 |

In Table 7, 240 kHz SCS may be used for SSB transmission, but may not be used for RMSI transmission. When the SSB SCS is 240 kHz, the RMSI SCS may be defined as 120 kHz. Alternatively, the SSB SCS and the RMSI SCS may be identically configured. If only the combinations of the SSB SCS and the RMSI SCS defined in Table 7 are available, there will be no need to change the SCS. Therefore, the 1-bit indicator used for SCS change (hereinafter, referred to as 'SCS change indicator') may be used to signal an SSB index. In FR2, up to 64 SSB indexes may be signaled using 3 bits of the PBCH DMRS sequence and 3 bits of the PBCH payload. When the SCS change indicator is used for signaling of an SSB index, 4 bits in the PBCH payload may be used for signaling of an SSB index. In this case, a maximum of 128 SSB indexes may be signaled.

Transmittable positions may be defined so that a maximum of L SSB transmissions are possible within an SSB burst set in the communication system. L may be set differently according to a frequency region (e.g., frequency band). For example, up to 4 SSB transmissions may be possible in a band of 0 to 3 GHz in FR1, and up to 8 SSB transmissions may be possible in a band of 3 GHz or above in FR1. Up to 64 SSB transmissions may be possible in FR2. Actual SSBs may be transmitted in all L positions. Alternatively, the actual SSBs may be transmitted in some of the L positions. When data is received at a position where the SSB can be transmitted, the terminal may determine whether to perform a rate matching operation on the data according to whether the SSB is actually transmitted at the position. Information on the positions where actual SSB transmission is performed may be signaled to the terminal through RMSI and UE-specific RRC signaling.

When the information of the positions where the actual SSB transmission is performed is transmitted through RMSI and L is 4 or 8, the position where the actual SSB is transmitted may be indicated by '1' in a bitmap included in the RMSI, and a position where the actual SSB is not transmitted may be indicated by '0' in the bitmap. When L is 64, information of 64 positions may be expressed in a compressed form of 16 bits. The terminal may receive the RMSI from the base station, and may determine whether to perform a rate matching operation on data based on the bitmap included in the RMSI (e.g., information indicating the positions where actual SSB transmission is performed). When the information indicating the positions where actual SSB transmission is performed is transmitted through UE-specific RRC signaling, the corresponding information may be represented by a full bitmap regardless of L.

As a high frequency band is used and the number of SCSs usable in the communication system increases, the number of transmittable SSBs may need to increase. For example, transmission of more than 64 SSBs may be required. If only some SSBs are actually transmitted, an appropriate signaling operation for the actual SSB transmissions may be required. In an RMSI signaling operation of the communication system, a 4-bit bitmap or an 8-bit full bitmap may be signaled according to L in FR1. In FR2, a bitmap in a compressed form may be signaled in consideration of signaling overhead. In FR2, 64 SSBs may be divided into 8 groups, and each group may include 8 SSBs. The actual SSB transmission(s) within one group may be represented by an 8-bit bitmap. The group(s) including actual SSB transmissions within the 8 groups may be represented by an 8-bit bitmap. In this case, 16 bits may be used for a signaling operation for actual SSB transmissions, and SSB transmission patterns in all groups may be configured identically.

Figure 13:
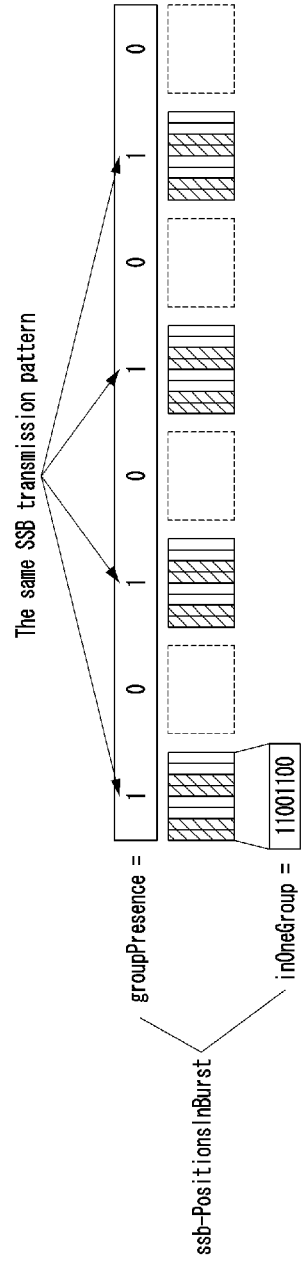
FIG. 13 is a conceptual diagram illustrating a first exemplary embodiment of a signaling method of actual SSB transmissions.

FIG. 13 is a conceptual diagram illustrating a first exemplary embodiment of a signaling method of actual SSB transmissions.

Referring to FIG. 13, the RMSI (e.g., ssb-PositionsInBurst included in the RMSI) may indicate positions of actual SSB transmissions in FR2. ssb-PositionsInBurst may include inOneGroup and groupPresence. The size of each of inOneGroup and groupPresence may be 8 bits. For example, each of inOneGroup and groupPresence may be an 8-bit bitmap. inOneGroup may inform whether actual SSB(s) are transmitted in each group. That is, inOneGroup may indicate an SSB transmission pattern in each group. groupPresence may inform group(s) in which actual SSB(s) are transmitted among the groups.

An SSB transmission pattern in group(s) corresponding to bit(s) set to 1 in groupPresence may be indicated by inOneGroup. The group(s) corresponding to bit(s) set to 1 in groupPresence may have the same SSB transmission pattern. According to the method described above, the transmittable positions of the 64 SSBs may be signaled by 16 bits. In this case, signaling overhead may be reduced, but the positions signaled by 16 bits may be different from the positions of actual SSB transmissions. For example, when different SSB transmission patterns are used in the first group and the third group shown in FIG. 13, the positions of the actual SSB transmissions may not be indicated according to the above-described method. In order to solve this problem, a 64-bit bitmap indicating the positions of the actual SSB transmissions may be additionally transmitted through UE-specific RRC signaling.

When transmission of more than 64 SSBs in a high frequency band is required, a new signaling method to support this may be required. In exemplary embodiments below, signaling methods for the actually transmitted SSBs among L (>64) SSBs will be proposed. In order to signal the actual transmission positions of a large number of SSBs, a method of extending the existing compression scheme may be used. While the number of SSBs in a group is fixed, the number of groups may be increased. Alternatively, the number of SSBs in a group may increase while the number of groups is fixed. For example, when there are a maximum of 128 SSB transmittable positions (e.g., when L is 128), the number of SSBs in a group may be fixed to 8, and the number of groups may be increased to 16. Alternatively, the number of SSBs in a group may be increased to 16, and the number of groups may be fixed to 8. In order to support the two methods described above, 24 bits may be needed.

The base station may set the number of SSBs in a group and/or the number of groups differently according to circumstances. This operation and/or the above-described setting may be signaled using a separate indicator. When the above-described method is used, as the maximum number of transmittable SSBs increases, the number of bits used to indicate actual SSB transmissions may increase. Accordingly, since the size of the RMSI payload increases, the above-described method may not be advantageous in terms of forward compatibility of the system.

Alternatively, the number (e.g., 16) of bits used to indicate actual SSB transmissions in FR2 may be fixed, and the above-described 16 bits may be applied in a cyclic wrap around manner. The entire 16-bit sequence may be cyclically applied to L (>64) SSB transmittable positions. 16 bits may not be divided into inOneGroup having a size of 8 bits (hereinafter, referred to as '8-bit inOneGroup') and groupPresence having a size of 8 bits (hereinafter referred to as '8-bit groupPresence'), and 16 bits may be sequentially applied to 16 SSB transmittable positions. Thereafter, the same information (e.g., 16 bits) may be cyclically mapped. In this case, 16 bits may be applied to all L (>64) SSB transmittable positions. For example, when there are a maximum of 128 SSB transmittable positions and the 16-bit sequence is '1100110011001100', the 16-bit sequence may be cyclically applied eight times. Since the 16-bit sequence is cyclically applied, the 17th SSB transmittable position may be the same as the first SSB transmittable position. According to the above-described method, signaling for more than 64 SSB transmittable positions may be possible without an increase in signaling overhead. Regardless of the increase in L, SSB transmittable positions may be signaled by the above-described method.

Alternatively, 16 bits may be divided into an 8-bit inOneGroup and an 8-bit groupPresence, and each of the 8-bit inOneGroup and 8-bit groupPresence may be cyclically applied. For example, when L is 128, the number of groups is fixed to 8, and the number of SSBs in a group increases to 16, the 8-bit inOneGroup may be cyclically applied to more than 8 SSB transmittable positions within a group. This operation may be referred to as 'Method 1'. When L is 128, the number of groups increases to 16, and the number of SSBs in a group is fixed to 8, the 8-bit groupPresence may be cyclically applied to more than 8 groups. This method may be referred to as 'Method 2'. The base station may configure (e.g., signal) the use of Method 1 or Method 2 to the terminal. Alternatively, "Method 1 is used" or "Method 2 is used" may be preconfigured. The terminal may identify the actual SSB transmission positions based on Method 1 or Method 2.

Alternatively, the base station may signal a start position of the actual SSB transmissions and/or the number of consecutive actual SSB transmissions to the terminal. In order to transmit SSBs through a plurality of beams, a beam sweeping operation may be required. In a period in which the beam sweeping operation is performed, a transmission beam of the base station may be changed. In this case, continuous data transmission and/or efficient data transmission may be difficult. Therefore, it may be preferable to configure a short period in which the beam sweeping operation is performed. After the actual SSB transmission starts, it may be preferable for the base station to continuously transmit the SSBs using a plurality of beams. In consideration of the above operation, the base station may signal the start position of the actual SSB transmissions and/or the number of consecutive actual SSB transmissions to the terminal.

The existing bits (e.g., 16 bits) may be used for the above-described signaling operation. When L exceeds 64, the number of bits for signaling the number of consecutive actual SSB transmissions may be calculated, and the remaining bits may be used to signal the start position of the actual SSB transmissions. For example, when L is 128, the number of consecutive actual SSB transmissions may be signaled by 7 bits, and the remaining 9 bits among 16 bits may be used to signal the start position of the actual SSB transmissions. Since only 7 bits are needed to indicate all candidate start positions, some bits may not be used. Even when L is set to a large value, the start position of the actual SSB transmissions and the number of consecutive actual SSB transmissions may be indicated using 16 bits.

Figure 14:
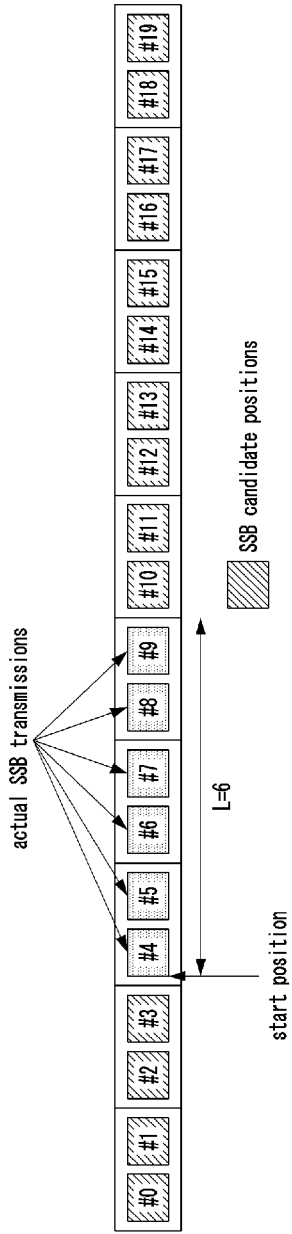
FIG. 14 is a conceptual diagram illustrating a second exemplary embodiment of a signaling method of actual SSB transmissions.

FIG. 14 is a conceptual diagram illustrating a second exemplary embodiment of a signaling method of actual SSB transmissions.

Referring to FIG. 14, the base station may transmit an RMSI (e.g., SIB1) indicating the positions of actual SSB transmissions. When L is 128, only 20 SSB transmittable positions are shown in FIG. 14 for convenience. Among the 16 bits, 7 bits may indicate the start position of the actual SSB transmissions, 7 bits may indicate the number of consecutive actual SSB transmissions, and 2 bits may be configured as reserved bits. The actual SSB transmissions may start at an SSB transmittable position #4 (e.g., SSB candidate position #4), and 6 consecutive SSBs may be transmitted. In this case, a 16-bit sequence including a combination of '0000100' indicating the SSB transmittable position #4 and '0000110' indicating the number of consecutive actual SSB transmissions (i.e., 6) and two reserved bits may be transmitted.

The terminal may receive the 16-bit sequence from the base station. The 16-bit sequence may be included in the RMSI. The terminal may identify that the actual SSBs are transmitted in the SSB transmittable positions #4 to #9 based on the 16-bit sequence, and may determine whether to perform a rate matching operation on received data according to the identified positions of the actual SSB transmissions.

In the communication system, a maximum of two SSBs may be transmitted within one slot. The SSB and the RMSI may be transmitted together in the same slot. Alternatively, it may be configured to transmit only one SSB in each slot. Even in this case, it may be efficient to continuously transmit SSBs. When the SSBs are continuously transmitted, the base station may perform a separate signaling operation to inform the terminal of the number (e.g., one or two) of SSBs transmitted in each slot. In this case, even when the number of consecutive actual SSB transmissions is the same, the actual SSB transmission positions may vary according to the number of SSBs transmitted in one slot. Therefore, a 1-bit indicator (hereinafter, referred to as 'SSB number indicator') indicating the number (e.g., one or two) of SSBs transmitted in each slot may be used.

Figure 15:
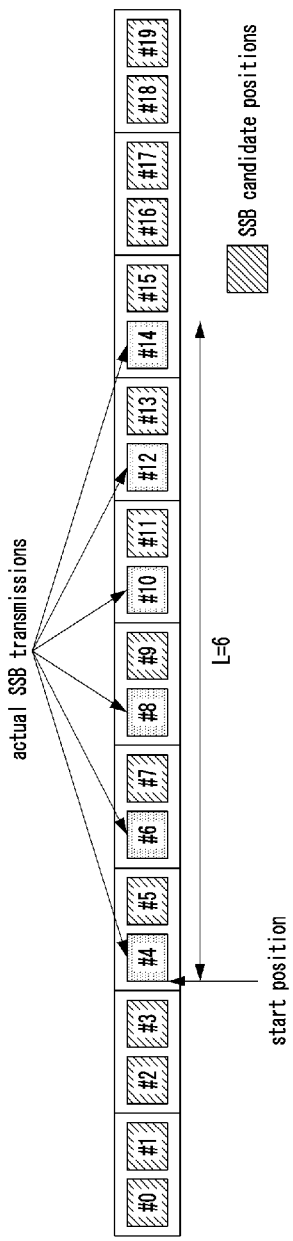
FIG. 15 is a conceptual diagram illustrating a third exemplary embodiment of a signaling method of actual SSB transmissions.

FIG. 15 is a conceptual diagram illustrating a third exemplary embodiment of a signaling method of actual SSB transmissions.

Referring to FIG. 15, the base station may transmit an RMSI (e.g., SIB1) indicating the position of actual SSB transmissions. The RMSI may include information on a combination of a start position of the actual SSB transmissions and the number of consecutive actual SSB transmissions. In addition, the base station may transmit to the terminal an SSB number indicator indicating that one SSB is transmitted in each slot. The start position of the actual SSB transmissions may be the SSB transmittable position #4, and the number of consecutive actual SSB transmissions may be 6. It may be configured to transmit one SSB in one slot.

When the SSB number indicator indicates that one SSB is transmitted in one slot, the terminal may determine that the actual SSBs are transmitted not in the SSB transmittable positions #4 to #9, but in the SSB transmittable positions #4, #6, #8, #10, #12, and #14. The terminal may identify the position(s) in which the actual SSB(s) are transmitted based on information on the start position of the actual SSB transmissions, the number of consecutive actual SSB transmissions, and the SSB number indicator, and based on the identified information, may determine whether to perform a rate matching operation.

Alternatively, the start position of actual SSB transmissions may always be configured to a specific position among SSB transmittable positions. That is, the start position of actual SSB transmissions may be fixed to a specific position. Alternatively, the start position of actual SSB transmissions may be limited to some SSB transmittable positions. According to the above method, the signaling overhead for the start position of actual SSB transmissions may be reduced. For example, the start position of actual SSB transmissions may configured to the first SSB transmittable position (e.g., SSB transmittable position #0 in FIG. 14 or 15) or the even-numbered SSB transmittable position (e.g., SSB transmittable positions #0, #2, #4, #6, etc. in FIG. 14 or 15). In this case, the number of bits required for signaling of the start position of actual SSB transmissions may be reduced.

The above-described methods may be applied not only when L>64 but also when L≤64. When $N_{SSB}^{QCL}$ (≤64) indicating a QCL relation between SSB candidate positions in an unlicensed band is configured, the number of SSBs transmittable through different beams may be limited to $N_{SSB}^{QCL}$. $N_{SSB}^{QCL}$ may indicate the number of SSBs having a QCL relation. In the method of signaling whether 64 SSBs are transmitted using a 16-bit sequence, information according to the 16-bit sequence may be sequentially applied by $N_{SSB}^{QCL}$ from the front, and subsequent information may be ignored. When the number of transmittable actual SSBs is less than 64, a method of signaling whether the actual SSBs are transmitted may be applied differently according to $N_{SSB}^{QCL}$.

Specifically, when $N_{SSB}^{QCL}$ is 16, the number of SSBs transmittable through different beams may be 16, and the actual number of bits capable of being signaled through the RMSI may be 16. In this case, the base station may signal information indicating whether to actually transmit SSBs by using the full bitmap. When $N_{SSB}^{QCL}$ is 32, the number of SSBs transmittable through different beams may be 32, and the actual number of bits capable of being signaled through the RMSI may be 16. The 16-bit sequence included in the RMSI may include {4-bit inOneGroup, 12-bit groupPresence} or {12-bit inOneGroup, 4-bit groupPresence}. Alternatively, one slot including two SSBs may be indicated by one bit. When one slot includes two SSBs, the 16-bit sequence may signal information on whether the actual SSB(s) are transmitted in 16 slots. In this case, signaling flexibility may be improved. When $N_{SSB}^{QCL}$ is 64, the existing signaling method may be used. Alternatively, when $N_{SSB}^{QCL}$ is 64, similarly to the case where $N_{SSB}^{QCL}$ is 32, two slots including 4 SSBs may be indicated by 1 bit, and the 16-bit sequence may signal information on whether the actual SSB(s) are transmitted in 32 slots.

When signaling of information on whether or not the actual SSB is transmitted is performed through the RMSI, it may be difficult to transmit accurate information due to a limitation in the number of bits. The position indicated by the signaling may be different from the position where the actual SSB is transmitted. In order to compensate for this problem, in the communication system, the base station may inform once more the transmission position of the actual SSB through UE-specific RRC signaling regardless of L. In this case, the actual SSB transmission position may be indicated by the full bitmap.

In the initial access procedure, the terminal may need to know a band type (e.g., licensed band or unlicensed band), an LBT usage state (e.g., LBT use or LBT non-use) in the unlicensed band, and/or a discovery burst transmission window (DBTW) usage state (e.g. DBTW enabled or DBTW disabled). The licensed band and/or the unlicensed band may be preconfigured. The licensed band and/or unlicensed band may vary according to countries and regions. The initial access procedure may be applied differently depending on operations in the licensed band or unlicensed band. In the unlicensed band, the LBT usage state may be determined according to national and regional regulations, and a DCI size for system information reception may vary according to the LBT usage state in the initial access procedure. The DBTW usage state considering an LBT failure may be applied differently depending on a system operation and environment. When operating not in the initial access step, the terminal may receive the above-described information (e.g., LBT usage state and/or DBTW usage state) through system information and/or UE-specific RRC signaling from the base station, and may perform an initial access procedure based on the received information. Since the above-mentioned information cannot be obtained before the initial access procedure, the terminal may obtain the above-mentioned information in the initial access procedure. The above-mentioned information may be obtained through a PBCH payload in the initial access procedure. In this case, the terminal may obtain the above-mentioned information most quickly in the initial access procedure.

Therefore, the band type, the LBT usage state in the unlicensed band, and/or the DBTW usage state in the unlicensed band may be jointly coded with $N_{SSB}^{QCL}$ indicating a QCL relation between SSB candidate positions. In order to provide many SSB transmission opportunities in consideration of an LBT failure in the unlicensed band, a DBTW may be introduced, and the base station may use 2 bits of the PBCH payload to signal $N_{SSB}^{QCL}$ indicating the QCL relation between SSB candidate positions within the DBTW. The joint coding operation for $N_{SSB}^{QCL}$ and the additional information may be performed using 3 bits or 4 or more bits of the PBCH payload.

TABLE 8

| Beam #2 | Beam #1 | Beam #0 | State |
|---|---|---|---|
| 0 | 0 | 0 | (licensed band) + DBTW disabled |
| 0 | 0 | 1 | (unlicensed band with LBT off state) + DBTW disabled |
| 0 | 1 | 0 | (unlicensed band with LBT on state) + DBTW enabled & $N_{SSB}^{QCL}$ = 8 |
| 0 | 1 | 1 | (unlicensed band with LBT on state) + DBTW enabled & $N_{SSB}^{QCL}$ = 16 |

TABLE 8-continued

| Beam #2 | Beam #1 | Beam #0 | State |
|---|---|---|---|
| 1 | 0 | 0 | (unlicensed band with LBT on state) + DBTW enabled & $N_{SSB}^{QCL}$ = 32 |
| 1 | 0 | 1 | (unlicensed band with LBT on state) + DBTW enabled & $N_{SSB}^{QCL}$ = 64 |
| 1 | 1 | 0 | (unlicensed band with LBT on state) + DBTW disabled |
| 1 | 1 | 1 | reserved |

In Table 8, $N_{SSB}^{QCL}$ may be jointly coded with information on the usage state of the unlicensed band, information on the LBT usage state, and/or information on the DBTW usage state. In Table 8, some states may be expressed as one. For example, in Table 8, '000' may indicate 'operation in an licensed band' and 'operation in an unlicensed band in which DBTW is disabled', and '001' may indicate 'operation in an unlicensed band in which LBT and DBTW are not used'. The operation according to '000' may be substantially identical to the operation according to '001'. Accordingly, the state according to '000' and the state according to '001' may be expressed as one state.

In Table 8, '101' may indicate 'operation in an unlicensed band in which LBT and DBTW are used' and $N_{SSB}^{QCL}$ set to 64 (e.g., maximum value), and '110' may indicate 'operation in an unlicensed band in which the LBT is used and DBTW is disabled'. The operation according to '101' may be substantially identical to the operation according to '110'. Accordingly, the state according to '101' and the state according to '110' may be expressed as one state. In this case, the number of necessary states may decrease, and the number of reserved states used for other purposes may increase. The above-described information may be expressed by reinterpreting the existing bits of the PBCH payload. In this case, it may be preferable to utilize unused bits among the existing bits. At least one bit among the fourth LSB of the SFN, dmrs-TypeA-Position, LSB(s) of ssb-SubcarrierOffset, or subCarrierSpacingCommon may be used to express the above-described information.

The base station and/or the terminal may determine the QCL relation between the SSB candidate positions based on [SSB candidate index mod Q]. Q may be $N_{SSB}^{QCL}$. The QCL relation between SSB candidate positions in the NR-U system may be indicated by $N_{SSB}^{QCL}$ within a DBTW. When the SSBs have the same ($N_{DM-RS}^{PBCH}$ mod $N_{SSB}^{QCL}$), the base station and/or the terminal may determine that the corresponding SSBs have the QCL relation. $N_{DM-RS}^{PBCH}$ may be a PBCH DMRS index (e.g., PBCH DMRS sequence) in the SSB. Since the maximum number of SSBs in the NR-U system operating in FR1 is 8, signaling of the SSB index may be possible only through the PBCH DMRS index. In addition, since the maximum value of $N_{SSB}^{QCL}$ is 8, the QCL relation between SSBs may be signaled through the above-described equation.

However, when an unlicensed band system (e.g., NR-U system) operates in a frequency band of 52.6 GHz or above, the SSB index may be signaled by a combination of the PBCH DMRS index and the PBCH payload. In this case, it may be impossible to signal the QCL relation between SSBs through the existing equation. When the number of transmittable SSBs in a frequency band of 52.6 GHz or above is increased, methods of signaling the QCL relation using the SSB candidate index instead of the PBCH DMRS index may be used. Specifically, when the SSBs have the same ($\bar{i}$ mod $N_{SSB}^{QCL}$), the base station and/or the terminal may determine that the corresponding SSBs have a QCL relation. $\bar{\iota}$ may be an SSB candidate index.

For example, the terminal may receive the SSB from the base station, and may identify SSB(s) having a QCL relation with the received SSB. The SSB(s) having the QCL relation may be determined based on the above-described method (e.g., $N_{DM-RS}^{PBCH}$ mod $N_{SSB}^{QCL}$). The terminal may identify an RO associated with the SSB(s) having the QCL relation, and may transmit a PRACH preamble to the base station in the identified RO. The terminal may calculate an RA-RNTI or MSGB-RNTI based on the RO (e.g., time and frequency resource index of the RO) in which the PRACH preamble is transmitted. In addition, the base station may calculate the RA-RNTI or MSGB-RNTI based on the RO (e.g., time and frequency resource index of the RO) in which the PRACH preamble is received. Each of the RA-RNTI and MSGB-RNTI may be calculated based on the above-described equation. The base station and the terminal may perform a 'transmission/reception operation of a Msg2 based on the RA-RNTI' or a 'transmission/reception operation of a Msg-B based on the MSGB-RNTI'.

The base station and/or the terminal may determine an SSB index between SSB candidate indexes based on [SSB candidate index mod Q]. Q may be $N_{SSB}^{QCL}$. In the NR-U system, the SSB index may be determined based on the PBCH DMRS index or the SSB candidate index. Since the maximum number of SSBs in the NR-U system operating in FR1 is 8, the SSB index determined based on the PBCH DMRS index may be the same as the SSB index determined based on the SSB candidate index. However, since the maximum number of SSBs is 64 in a frequency band of 52.6 GHz or above, an accurate SSB index may not be calculated based on the PBCH DMRS index. Therefore, it may be preferable that the calculation of the SSB index in a frequency band of 52.6 GHz or above is performed using only the SSB candidate index. A method of determining the SSB index may vary according to a frequency band.

The base station and/or the terminal may determine the SSB index based on the PBCH DMRS index or the SSB candidate index in FR1, and in a frequency band of 52.6 GHz or above (e.g., a frequency band in which the maximum number of transmittable SSBs exceeds 8), may determine the SSB index using only the SSB candidate index. That is, a method of determining an SSB index in a first frequency band (e.g., FR1) may be different from a method of determining an SSB index in a second frequency band (e.g., frequency band of 52.6 GHz or above, FR2-2).

Specifically, in a frequency band in which the maximum number of transmittable SSBs is 8 or less, the base station and/or the terminal may determine a result of ($N_{DM-RS}^{PBCH}$ mod $N_{SSB}^{QCL}$) or ($\bar{\iota}$ mod $N_{SSB}^{QCL}$) as the SSB index. In a frequency band in which the maximum number of transmittable SSBs exceeds 8, the base station and/or the terminal may determine a result of ($\bar{\iota}$ mod $N_{SSB}^{QCL}$) as the SSB index.

For example, the terminal may receive an SSB from the base station, and may determine an index of the received SSB. The SSB index may be determined based on the above-described methods. The terminal may determine the SSB index based on ($N_{DM-RS}^{PBCH}$ mod $N_{SSB}^{QCL}$) or ($\bar{\iota}$ mod $N_{SSB}^{QCL}$) in a first frequency band, and may determine the SSB index based on ($\bar{\iota}$ mod $N_{SSB}^{QCL}$) in a second frequency hand higher the first frequency band. The terminal may identify an RO associated with the SSB index, and may transmit a PRACH preamble to the base station in the identified RO. The terminal may calculate an RA-RNTI or MSGB-RNTI based on the RO (e.g., time and frequency resource index of the RO) in which the PRACH preamble is transmitted. In addition, the base station may calculate the RA-RNTI or MSGB-RNTI based on the RO (e.g., time and frequency resource index of the RO) in which the PRACH preamble is received. Each of the RA-RNTI and MSGB-RNTI may be calculated based on the above-described equation. The base station and the terminal may perform a 'transmission/reception operation of a Msg2 based on the RA-RNTI' or a 'transmission/reception operation of a Msg-B based on the MSGB-RNTI'.

In the RMSI CORESET mapping pattern #1 shown in FIG. 9, the terminal may monitor a Type0 PDCCH in two consecutive slots, and slots for monitoring the Type0 PDCCH may be configured according to the SSB index. In the NR-U system, the base station and/or the terminal may perform an LBT operation before transmission, and may perform the transmission when the LBT operation is successful. In this case, a transmission latency may occur. When the LBT operation is performed for each of SSB transmission and Type0 PDCCH transmission in the NR-U system, a latency may occur in the initial access procedure due to a failure of the LBT operation. In order to reduce the latency in the initial access procedure, the SSB and the Type0 PDCCH may be configured to be transmitted in one slot, and the SSB and the Type0 PDCCH located in one slot may be multiplexed in the frequency domain. In order to support this operation, the SSB and the Type0 PDCCH may be configured to be located in the same slot. Here, the position of the Type0 PDCCH may be determined by the SSB index.

In the NR-U system supporting 15 kHz SCS and/or 30 kHz SCS, SSBs may be continuously transmitted as in the exemplary embodiment shown in FIG. 8. Therefore, even when the position of the Type0 PDCCH is determined by the SSB index, the SSB and the Type0 PDCCH may be transmitted in the same slot. However, when the SSBs are transmitted in radio resources to which a large SCS is applied, the SSB indexes continuously increase in the time domain, but a time gap may exist between the slots in which the actual SSBs are transmitted, and a discontinuous period due to the time gap may exist. When calculating the position of the Type0 PDCCH (e.g., the position of the slot to which the Type0 PDCCH belongs) based on the SSB index, some Type0 PDCCHs may not be located in the same slot as the SSB due to a discontinuous period. In this case, system efficiency may be reduced, and the initial access procedure may be delayed. In consideration of the above-described situation, the methods of configuring the position of the Type0 PDCCH may be required.

A frequency band of 52.6 GHz or above may support 480 kHz SCS and/or 960 kHz SCS. A time gap for UL transmission may be configured after transmission of consecutive SSBs. The number of slots to which the consecutive SSBs belong may be referred to as $M_{slot}$, and the number of slots for the time gap may be referred to as $N_{slot}$. In consideration of the above situation, methods for configuring the position of the Type0 PDCCH (e.g. Type0 PDCCH slot) may be required. The Type0 PDCCH slot may mean a slot to which the Type0 PDCCH belongs. The base station and/or the terminal may calculate a start position $n_0$ of the Type0 PDCCH slot based on Equation 13 below.

$$n_0 = (O \cdot 2^\mu + \lfloor i \cdot M \rfloor) \bmod N_{slot}^{frame,\mu} \qquad \text{[Equation 13]}$$

In Equation 13, $\mu$ may indicate an SCS. $\mu$ set to 5 may indicate 480 kHz SCS, and $\mu$ set to 6 may indicate 960 kHz SCS. i may be an SSB index. O and M may be configurable parameters for calculating the position of the Type0 PDCCH slot. O may indicate an offset between the SSB and the Type0 PDCCH slot. M may be used to determine whether to overlap between slots when the Type0 PDCCH monitoring is performed in two consecutive slots.

$N_{slot}^{frame,\mu}$ may indicate the number of SCS slots corresponding to $\mu$ within a radio frame. When the position of the Type0 PDCCH slot is determined based on Equation 13, the above-described problems may occur. In order to solve these problems, the base station and/or the terminal may determine the start position $n_0$ of the Type0 PDCCH slot using Equation 14 below.

$$n_0 = (O \cdot 2^\mu + \lfloor i \cdot M \rfloor + \lfloor (i \cdot M)/M_{slot} \rfloor \cdot N_{slot}) \bmod N_{slot}^{frame,\mu} \quad [\text{Equation 14}]$$

In Equation 14, $M_{slot}$ may indicate the number of consecutive slots to which the SSB belongs, and $N_{slot}$ may indicate the number of slots for the time gap between consecutive slots. When the start position of the Type0 PDCCH slot is calculated by Equation 14, the SSB and the Type0 PDCCH may be configured to be transmitted in the same slot regardless of the time gap. In the same manner as for SSB transmission, a time gap for securing a UL transmission period between Type0 PDCCH slots may be configured.

Figure 16A:
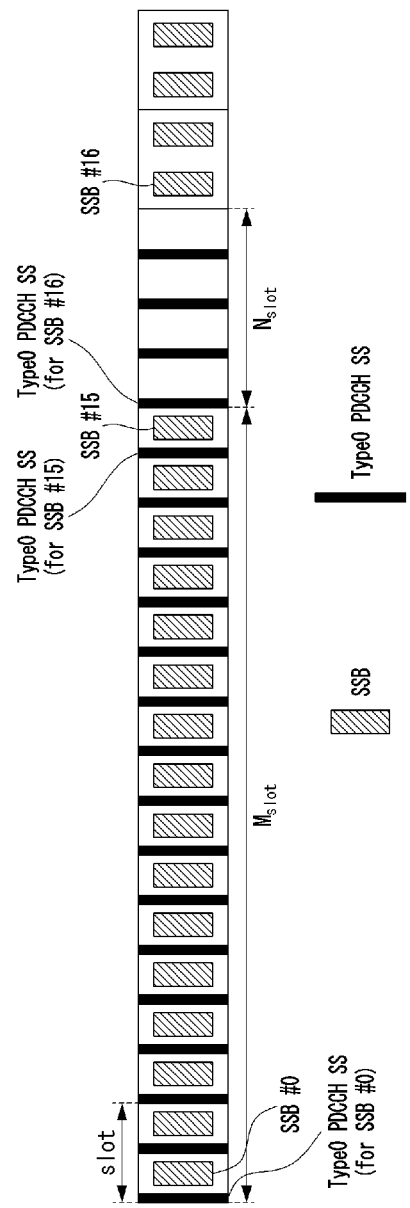
FIG. 16A is a conceptual diagram illustrating a first exemplary embodiment of a Type0 PDCCH SS configuration.
Figure 16B:
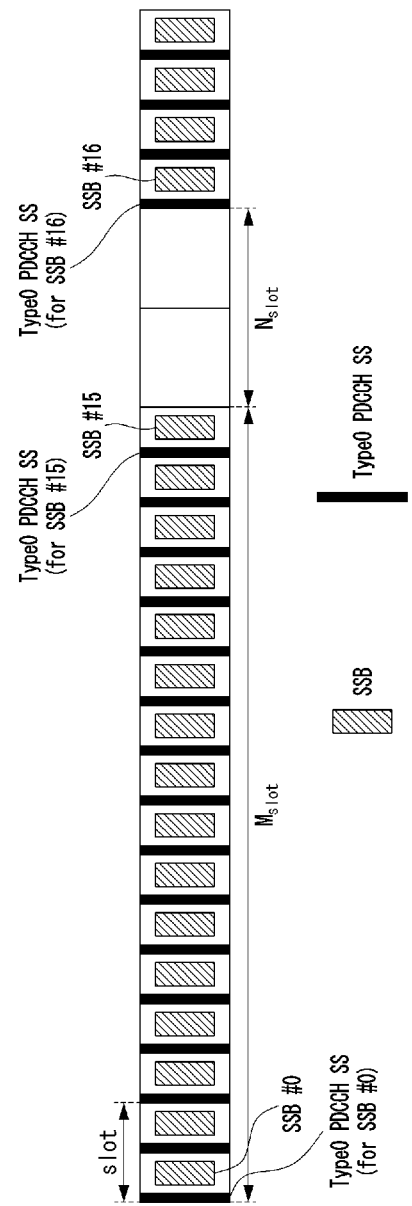
FIG. 16B is a conceptual diagram illustrating a second exemplary embodiment of a Type0 PDCCH SS configuration.

FIG. 16A is a conceptual diagram illustrating a first exemplary embodiment of a Type0 PDCCH SS configuration, and FIG. 16B is a conceptual diagram illustrating a second exemplary embodiment of a Type0 PDCCH SS configuration.

The Type0 PDCCH SS shown in FIG. 16A may be configured based on Equation 13. The Type0 PDCCH SS may mean a search space for the Type0 PDCCH. The Type0 PDCCH SS may be located in the Type0 PDCCH slot. $N_{slot}$ time gaps may be configured after SSB transmission in consecutive $M_{slot}$ slots. In this case, a Type0 PDCCH SS associated with an SSB #16 may be configured in a slot different from that of the SSB #16.

The Type0 PDCCH SS shown in FIG. 16B may be configured based on Equation 14. In this case, regardless of the time gap, the SSB and the Type0 PDCCH SS may be configured in the same slot. When Equation 14 is used, $N_{slot}$ time gaps may be configured after consecutive $M_{slot}$ slots. In $N_{slot}$ time gaps, SSB transmission may not be performed, and a Type0 PDCCH SS may not be configured.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
   receiving, from a base station, a first synchronization signal block (SSB);
   determining a random access channel (RACH) occasion (RO) associated with the first SSB;
   transmitting, to the base station, a physical random access channel (PRACH) preamble in the RO within a first radio resource to which a first subcarrier spacing (SCS) is applied;
   determining a position of a slot to which the RO belongs in a reference radio resource to which a reference SCS is applied;
   determining a radio network temporary identifier (RNTI) for a random access (RA) procedure based on a slot index corresponding to the position of the slot in the reference radio resource; and
   performing a reception operation of a response for the PRACH preamble by using the RNTI in the first radio resource.

2. The operation method according to claim 1, wherein the first SCS is a 480 kHz SCS or a 960 kHz SCS, the reference SCS is a 120 kHz SCS, and the RNTI is a random access (RA)-RNTI or an MSGB-RNTI.

3. The operation method according to claim 1, wherein one slot in the reference radio resource includes n slots in the first radio resource, the RO is located in one or more slots among the n slots, the slot index used to determine the RNTI is a slot index of the one slot instead of the one or more slots, and n is a natural number equal to or greater than 2.

4. The operation method according to claim 3, wherein a start slot of the RO is limited to a specific slot among the n slots in the first radio resource.

5. The operation method according to claim 3, wherein the one or more slots are located last among the n slots in the first radio resource.

6. An operation method of a base station in a communication system, the operation method comprising:
   transmitting a first synchronization signal block (SSB);
   receiving, from a terminal, a physical random access channel (PRACH) preamble in a random access channel (RACH) occasion (RO) associated with the first SSB in a first radio resource to which a first subcarrier spacing (SCS) is applied;
   determining a position of a slot to which the RO belongs in a reference radio resource to which a reference SCS is applied-instead of the first SCS;
   determining a radio network temporary identifier (RNTI) for a random access (RA) procedure based on a slot index corresponding to the position of the slot in the reference radio resource; and
   performing a transmission operation of a response for the PRACH preamble by using the RNTI in the first radio resource.

7. The operation method according to claim 6, wherein the first SCS is a 480 kHz SCS or a 960 kHz SCS, the reference SCS is a 120 kHz SCS, and the RNTI is a random access (RA)-RNTI or an MSGB-RNTI.

8. The operation method according to claim 6, wherein one slot in the reference radio resource includes n slots in the first radio resource, the RO is located in one or more slots among the n slots, the slot index used to determine the RNTI is a slot index of the one slot instead of the one or more slots, and n is a natural number equal to or greater than 2.

9. The operation method according to claim 8, wherein a start slot of the RO is limited to a specific slot among the n slots in the first radio resource.

10. The operation method according to claim 8, wherein the one or more slots are located last among the n slots in the first radio resource.

11. A terminal in a communication system, the terminal comprising:
- a processor;
- a memory electronically communicating with the processor; and
- instructions stored in the memory, wherein when executed by the processor, the instructions cause the terminal to:
- receive, from a base station, a first synchronization signal block (SSB);
- determine an SSB index associated with the first SSB based on a different scheme according to a frequency band in which the base station operates;
- determine a random access channel (RACH) occasion (RO) associated with the SSB index; and
- transmit a physical random access channel (PRACH) preamble to the base station in the RO, wherein when the base station operates in a first frequency band, the SSB index is determined based on a first equation or a second equation, and when the base station operates in a second frequency band higher than the first frequency band, the SSB index is determined based on the second equation, the first equation is [an index of a physical broadcast channel (PBCH) demodulation reference signal (DMRS) mod $N_{SSB}^{QCL}$], the second equation is [an SSB candidate index mod $N_{SSB}^{QCL}$], the PBCH DMRS is included in the first SSB, the SSB candidate index is associated with the first SSB, and $N_{SSB}^{QCL}$ indicates a number of SSBs having a quasi-co-located (QCL) relation.

12. The terminal according to claim 11, wherein the SSB index associated with the first SSB is an SSB index of a second SSB having a QCL relation with the first SSB.

\* \* \* \* \*